US007346780B2

(12) United States Patent
Sinha et al.

(10) Patent No.: US 7,346,780 B2
(45) Date of Patent: *Mar. 18, 2008

(54) INTEGRITY ORDAINMENT AND ASCERTAINMENT OF COMPUTER-EXECUTABLE INSTRUCTIONS

(75) Inventors: Saurabh Sinha, Seattle, WA (US); Mariusz H. Jakubowski, Bellevue, WA (US); Ramarathnam Venkatesan, Redmond, WA (US); Yuqun Chen, Bellevue, WA (US); Matthew Cary, Seattle, WA (US); Ruoming Pang, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 898 days.

This patent is subject to a terminal disclaimer.

(21) Appl. No.: 10/116,440

(22) Filed: Apr. 3, 2002

(65) Prior Publication Data
US 2003/0191942 A1    Oct. 9, 2003

(51) Int. Cl.
G06F 11/30 (2006.01)
G06F 12/14 (2006.01)

(52) U.S. Cl. .................. 713/187; 713/176; 713/194; 726/24

(58) Field of Classification Search ............ 713/187, 713/176, 194; 726/24
See application file for complete search history.

(56) References Cited

U.S. PATENT DOCUMENTS

| 5,050,212 | A * | 9/1991 | Dyson ............ 713/187 |
| 5,548,759 | A | 8/1996 | Lipe |
| 5,708,811 | A | 1/1998 | Arendt et al. |
| 5,764,987 | A | 6/1998 | Eidt et al. |
| 6,141,698 | A | 10/2000 | Krishnan et al. |
| 6,393,594 | B1 | 5/2002 | Anderson et al. |
| 6,636,942 | B2 | 10/2003 | Greco |
| 6,687,749 | B1 | 2/2004 | Chavez et al. |
| 6,742,176 | B1 | 5/2004 | Million et al. |
| 7,080,249 | B1* | 7/2006 | Jakubowski et al. ....... 713/165 |
| 2002/0166062 | A1* | 11/2002 | Helbig, Sr. ................ 713/200 |

OTHER PUBLICATIONS

Vigna, Giovanni; Protecting Mobile Agents Through Tracing; Proceedings of the Third Workshop on Mobile Object Systems Jyvaskyla, Finland Jun. 1997.*

Monrose, Fabian et al, "Distributed Execution with Remote Audit", 1999.

(Continued)

*Primary Examiner*—Gilberto Barron
*Assistant Examiner*—A. Nobahar
(74) *Attorney, Agent, or Firm*—Lee & Hayes, PLLC

(57) ABSTRACT

An implementation of a technology, described herein, for facilitating the protection computer-executable instructions, such as software. At least one implementation, described herein, may generate integrity signatures of multiple sets of computer-executable instructions based upon the output trace and/or an execution trace of such sets. With at least one implementation, described herein, a determination may be made about whether two or more of such sets are unaltered duplicates by comparing integrity signatures of such sets. This abstract itself is not intended to limit the scope of this patent. The scope of the present invention is pointed out in the appending claims.

56 Claims, 11 Drawing Sheets

OTHER PUBLICATIONS

Zachary, John. "Protecting Mobile Code in the Wild", 2003 IEEE.
Thomas, Roshan., "A Survey of Mobile Code Security Techniques", Oct. 1999.
Lin, Chun-Liang et al. "Tamper-proofing of Java Programs by Oblivious Hashing", 2005.
Gong, Li. Inside Java 2 Platform Security, Architecture, API Design and Implementation, Jun. 1999 Sun Microsystems, pp. 21-25.
Chen, Yugun et al., "Oblivious Hashing: A Stealthy Software Integrity Verification Primitive", 2002.

* cited by examiner

Subject code for testing     Signature of subject code using same given parameters

INTEGRITY ORDAINMENT AND ASCERTAINMENT OF COMPUTER-EXECUTABLE INSTRUCTIONS

TECHNICAL FIELD

This invention generally relates to a technology for facilitating the protection computer-executable instructions, such as software.

BACKGROUND

Digital goods (e.g., software products, data, content, etc.) are often distributed to consumers via fixed computer readable media, such as a compact disc (CD-ROM), digital versatile disc (DVD), soft magnetic diskette, or hard magnetic disk (e.g., a preloaded hard drive). More recently, more and more content is being delivered in digital form online over private and public networks, such as Intranets and the Internet. Online delivery improves timeliness and convenience for the user, as well as reduces delivery costs for a publisher or developers. Unfortunately, these worthwhile attributes are often outweighed in the minds of the publishers/developers by a corresponding disadvantage that online information delivery makes it relatively easy to obtain pristine digital content and to pirate the content at the expense and harm of the publisher/developer.

One concern of the publisher/developer is the ability to check digital content, after distribution, for alteration. Such checking is often referred to as SRI (Software Resistance to Interference). The reasoning for the desire to check for such alterations can vary (e.g., to ensure that the content continues to operate as intended by the publisher/developer, to protect against improper copying, etc.).

The unusual property of content is that the publisher/developer (or reseller) gives or sells the content to a client, but continues to restrict rights to use the content even after the content is under the sole physical control of the client. For instance, a software developer typically sells a limited license in a software product that permits a user to load and run the software product on one or more machines (depending upon the license terms), as well as make a back up copy. The user is typically not permitted to make unlimited copies or redistribute the software to others.

These scenarios reveal a peculiar arrangement. The user that possesses the digital bits often does not have full rights to their use; instead, the provider retains at least some of the rights. In a very real sense, the legitimate user of a computer can be an adversary of the data or content provider.

DRM Techniques

One of the uses for SRI (Software Resistance to Interference) is to provide "digital rights management" (or "DRM") tamper-resistance (i.e., protection) to prevent unauthorized modification, distribution, copying, and/or illegal operation of, or access to the digital goods. An ideal digital goods distribution system would substantially prevent unauthorized modification/distribution/use of the digital goods.

Digital rights management is fast becoming a central requirement if online commerce is to continue its rapid growth. Content providers and the computer industry must quickly address technologies and protocols for ensuring that digital goods are properly handled in accordance with the rights granted by the developer/publisher. If measures are not taken, traditional content providers may be put out of business by widespread theft or, more likely, will refuse altogether to deliver content online.

Various DRM techniques have been developed and employed in an attempt to thwart potential pirates from illegally copying or otherwise distributing the digital goods to others.

Original Media Required

For example, one conventional DRM technique includes requiring the consumer to insert the original CD-ROM or DVD for ascertainment prior to enabling the operation of a related copy of the digital good. Unfortunately, this DRM technique typically places an unwelcome burden on the honest consumer, especially those concerned with speed and productivity. Moreover, such techniques are impracticable for digital goods that are site licensed, such as software products that are licensed for use by several computers, and/or for digital goods that are downloaded directly to a computer. Additionally, it is not overly difficult for unscrupulous individuals/organizations to produce working pirated copies of the CD-ROM.

Registration

Another conventional DRM technique includes requiring or otherwise encouraging the consumer to register the digital good with the provider. For example, this is often done either through the mail or online via the Internet or a direct connection. Thus, the digital good may require the consumer to enter a registration code before allowing the digital good to be fully operational or the digital content to be fully accessed. Unfortunately, such DRM techniques are not typically effective since unscrupulous individuals/organizations need only undermine the DRM protections in a single copy of the digital good. Once broken, copies of the digital good can be illegally distributed; hence, such DRM techniques are considered to be Break-Once, Run-Everywhere (BORE) susceptible. Various techniques may be used to overcome some of the BORE susceptible, such as per-user software individualization, watermarks, etc. However, a malicious user may still be able to identify and remove from the digital good these various protections.

Code Obfuscation

Still another DRM technique is an emerging one called "code obfuscation" or "code scrambling." Code obfuscation is described, to some degree, in the following co-pending patent applications (all of which are assigned to the Microsoft Corporation):

U.S. patent application Ser. No. 09/670,916, entitled "Code Integrity Verification that Includes One or More Cycles" filed on Sep. 29, 2000;

U.S. patent application Ser. No. 09/536,033, entitled "System and Method for Protecting Digital Goods using Random and Automatic Code Obfuscation" filed on Mar. 27, 2000;

U.S. patent application Ser. No. 09/651,424, entitled "Method and System for Using a Portion of a Digital Good as a Substitution Box" filed on Aug. 30, 2000; and U.S. patent application Ser. No. 09/651,901, entitled "Protecting Digital Goods using Oblivious Checking" filed on Aug. 30, 2000.

Code obfuscation thwarts would-be software pirate's attempt to attack the licensing provisions in digital goods (such as software). It also thwarts malicious would-be interlopers when they attempt to modify the security portions of such digital goods. In either case, existing code obfuscation techniques complicate an attacker's attempt to locate and identify specific portions of code within a software program (such as the operating system or an application).

Code obfuscation techniques effectively "hide" (i.e., obfuscate) or "scramble" the underlying code of a digital good, thereby making it difficult for a would-be attacker to locate and identify portions of the code.

Although it may be difficult, an attacker may be able to overcome code obfuscation. For example, an attacker can track the execution instance of the software program to identify where and when specific actions are performed. Once an attacker identifies and locates specific portions of code, she may modify it. Conventional code obfuscation cannot prevent code modification. Conventional code obfuscation cannot detect when code has been modified.

Code Modification

As stated above, the publisher/developer would like the ability to check digital content, after distribution, for alteration. The reasons for checking for such alterations may vary (e.g., to ensure that the content continues to operate as intended by the publisher/developer, to protect against improper copying, etc.). However, conventional DRM techniques do not actually check for alteration of digital content, such as software code.

Strictly speaking, conventional DRM techniques are chiefly designed to complicate code analysis by the digital pirate. They erect barriers and obstacles to unauthorized use of the software and/or unauthorized access the underlying code. However, they cannot detect code modification (i.e., alternation).

Accordingly, there is a challenge for a DRM technique to increase tamper resistance by detecting code modification without imposing unnecessary and burdensome requirements on legitimate users.

Remote Code Ascertainment

"Remote code ascertainment" is another realm that lacks the capability to effectively detect code modifications. A generic example of "remote code ascertainment" is the following: a computing entity (e.g., server) can ensure that only authorized (e.g., unaltered) computing entities (e.g., a client software program) connect via a remote coupling and that such remote entities remain free from tampering. This is also called: "persistent remote authentication."

Some systems, such as those employing Internet instant-messaging systems, include a small, simple client program that connects to a secure server over a network. Deployers of such systems may require that only authorized, unmodified client software use the servers.

How does the server in such a system ascertain that the client software with which it is communicating is unmodified, unaltered, unadulterated, untainted, etc. by the devious hands of malicious would-be infiltrator? The issue here is not whether the proper security protocol is followed and the proper security information is provided. Rather the issue is whether the server can be certain that the security features of the client software have not be hijacked by a malicious would-be infiltrator.

Generally speaking, for an experienced software expert, it is not particularly difficult to reverse engineer the client-server communications. Therefore, an attacker can create a fully functional but unauthorized client program. Moreover, an attacker can patch the original code or data of authorized client software to instruct it to perform unauthorized and undesirable actions.

Traditional authentication protocols do not address the problem described. Unauthorized parties can reverse engineer such protocols and write new software to implement them. An attacker can modify a client program's code or data without changing its implementation of an authentication protocol. Traditional protocols do not address code tampering.

Accordingly, there is a challenge for a technique to confirm the veracity of a remote software program. Conventionally, it is a challenge to effectively thwart maliciously modified programs from harming a network system by preventing their initial passage through the security layers by masquerading as the original and unaltered program.

The Challenge of Accurately Detecting Code Modification

Accordingly, it is a challenge for a technique to address the concerns of the publisher/developer in protecting their rights in a digital good, such as software. Specifically, it is a challenge for to detect an alteration of the digital content without imposing unnecessary and burdensome requirements on legitimate users.

Furthermore, it is a challenge for to test the veracity of a remote software program. Specifically, it is a challenge for to detect a modified program so that it cannot impersonate the original and unaltered program.

SUMMARY

Described herein is a technology for facilitating the protection computer-executable instructions, such as software.

At least one implementation, described herein, may generate integrity signatures of multiple sets of computer-executable instructions based upon the output trace and/or an execution trace of such sets. With at least one implementation, described herein, a determination may be made about whether two or more of such sets are unaltered duplicates by comparing integrity signatures of such sets.

With at least one implementation, described herein, a plurality of input parameters to provide to a set of computer-executable instructions (e.g., a program module) of a digital good. The execution instance of the set of instructions generates an output for a specified input parameter. These outputs are stored in output trace. This implementation generates an integrity signature based upon the output trace. This technique may be generally called "integrity ordainment," herein.

With at least one implementation, described herein, hidden instructions are inserted within the set of computer-executable instructions of the digital good to produce a protected form of such. When the set of instructions are executed, these hidden instructions generate an execution trace of various morsels of data. This implementation generates an integrity signature based upon the execution trace of the set of instructions when the set is given one or more specified parameters. This technique may be generally called "integrity ordainment," herein.

Another implementation, described herein, combines the features and functions of the "execution-trace" implementation and the "output-trace" implementation.

Still another implementation, described herein, verifies the integrity of a digital good. It does so by determining whether one or more computer-executable instructions of the digital goods have been altered. This detection technique is called "integrity ascertainment," herein.

At least one implementation, described herein, generates an integrity signature for a set of instructions of a subject digital good (i.e., the one being tested for integrity). With at least one implantation, described here, the same specified parameters (or associated parameters) are used to generate both the original signature during integrity ordainment and during integrity ascertainment.

With at least one implantation, described here, the signature may be an execution-signature that is based upon an execution trace of the set of instructions of a subject digital good. With at least another implantation, described here, the signature may be an output-signature that is based upon an output trace of the set of instructions of a subject digital good. With at least another implantation, described here, the signature may be either, both, or some combination of the execution-signature and/or the output-signature.

With at least one implantation, described here, the original signature(s) generated during integrity ordainment is/are compared to the signature(s) generated during integrity ascertainment. If they are indistinguishable, then the digital good is unmodified. Otherwise, the digital good has been modified from its original state.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

Figure 1A:
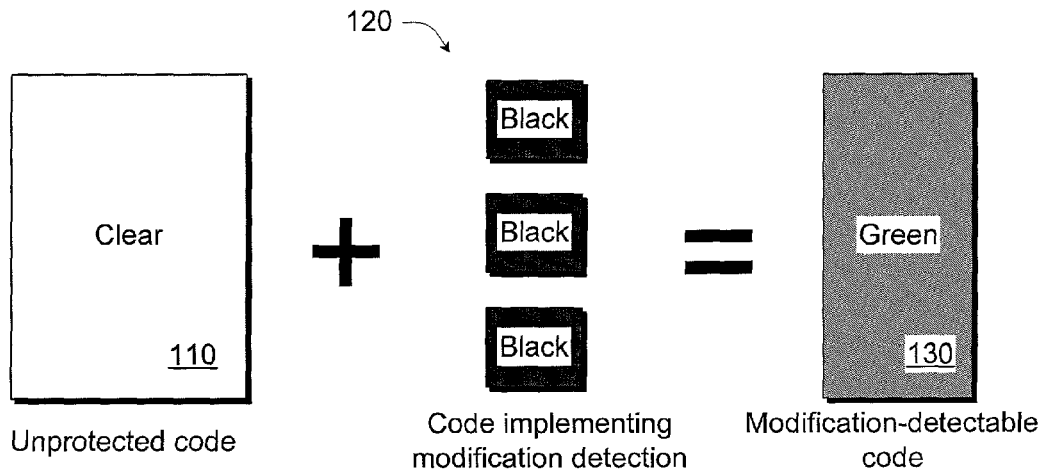
FIGS. 1A-1F are block diagrams illustrating the logical components manipulated by an implementation described herein and their relationships and associations with each other within the context of the implementation.

The following description sets forth one or more specific embodiments of integrity ordainment and ascertainment of computer-executable instructions that incorporate elements recited in the appended claims. These embodiments are described with specificity in order to meet statutory written description, enablement, and best-mode requirements. However, the description itself is not intended to limit the scope of this patent.

The one or more specific embodiments, described herein, are exemplary implementations of an integrity ordainment and ascertainment of computer-executable instructions. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of an integrity ordainment and ascertainment of computer-executable instructions may be referred to as an "exemplary integrity ordainer/ascertainer." Alternatively, it may be called an "exemplary integrity veracitor." The exemplary integrity veracitor may include an exemplary integrity ordainer and/or an exemplary integrity ascertainer.

Brief Glossary

To aid the reader, the following brief glossary is provided as a quick reference to the definitions of terms that are otherwise not common in the art. This glossary primarily covers terms related to the color-coding of computer-executable instructions (i.e., code). This color-coding is purely for explanatory purposes only. Of course, such code has no actual color, but if it did, the actual color plays no functional role.

Integrity Veracitication—this includes integrity ordainment and integrity ascertainment. "Veracitication" is noun form of a verb form of the word "veracity," which generally means "adherence to the truth; truthfulness; conformity to fact or truth; something that is true."

Integrity Ordainment—this may be thought of as the front-end of integrity veracitication. "Ordainment" is noun form of the word "ordain," which generally means, "to prearrange unalterably." Implementations of integrity ordainment techniques may employ execution tracing and hashing, output tracing and hashing, or a combination of both.

Integrity Ascertainment—this may be thought of as the back-end of integrity veracitication. "Ascertainment" is noun form of the word "ascertain," which generally means, "to discover with certainty, as through examination or experimentation." This may also be called "integrity verification."

Clear code 110—unprotected original computer-executable instructions of a digital good. Alternatively, this may refer to same instructions after it is obfuscated using code obfuscation techniques, but for the purpose of this discussion, it will be assumed that the original instructions are "unprotected" in terms of integrity veracitication.

Black code 120—hidden, special-purpose instructions that are strategically, distributively inserted within the clear code. With the exemplary integrity veracitor, this code generates an execution trace of various morsels of data. Use of black code is not necessary for output tracing and hashing.

Green code 130—the combination of clear and black code. This code is known and/or determined to be unmodified. This code is the result of integrity ordainment. The green code 130 is derived from the clear code 110, but it is modified to detect alterations that a pirate might do. When output tracing and hashing are employed (without execution tracing and hashing), clear code and green code are the same because black code is unnecessary.

Red code 150—modified code; green code after it has been modified by a pirate; code that is determined and/known to be modified.

Yellow code 160—code that is suspected of having been modified (i.e., it is subject of detection tests); code that is the subject of integrity ascertainment tests.

Parameters 140—herein, this refers to one or more specific parameters that are passed to a program module (i.e., function, set of instructions, etc.) that are used to generate one or more signatures. Typically, these parameter(s) have specified value(s) that generate a signature that remains the same for each execution instance of the module as long as the module remains unmodified.

Green signature 132—a signature is a specific value that identifies the execution instance of a program module (in this case, of green code) based upon one or more specified parameters. A green signature is one generated during integrity ordainment and it is the basis for determining if the code of a module has been modified.

Yellow signature 162—a signature is a specific value that identifies the execution instance of a program module (in this case, of yellow code). A yellow signature is one generated during integrity ascertainment and it is compared to the green signature to determine if the code of a module has been modified.

Integrity Veraciticaton

The one or more exemplary implementations, described herein, of the present claimed invention may be implemented (in whole or in part) by an integrity veraciticaton system. The integrity veraciticaton system may be part of a digital rights management (DRM) distribution architecture 300; an integrity ascertainment architecture 400; and/or a computing environment like that shown in FIG. 9. It may be implemented by an integrity ordainer 370; an integrity ascertainment system 402; and/or a computing environment like that shown in FIG. 9.

At least one implementation, described herein, may generate integrity signatures of multiple sets of computer-executable instructions based upon the output trace and/or an execution trace of such sets. With at least one implementation, described herein, a determination may be made about whether two or more of such sets are unaltered duplicates by comparing integrity signatures of such sets.

There are at least two forms "integrity veraciticaton" techniques: One employs execution tracing and another employs output tracing. These two forms may be employed together or separately of the other.

Integrity Ordainment

There are two forms of a technique generally called "integrity ordainment:" One for execution tracing and one for output tracing. These two forms of technique may be employed together or separately of the other.

With at least one implementation of the output-tracing form of the integrity ordainment technique, a plurality of input parameters to provide to a set of computer-executable instructions (e.g., a program module) of a digital good. The execution instance of the set of instructions generates an output for a specified input parameter. These outputs are stored in output trace. This implementation generates an integrity signature based upon the output trace. This integrity signature may also be called an "output-identifying" signature. However, more generally, this integrity signature may also be called an "execution-identifying" signature since it represents (and thus identifies) multiple execution instances of a program module.

With at least one implementation of the execution-tracing form of the integrity ordainment technique, hidden instructions are inserted within the set of computer-executable instructions of the digital good to produce a protected form of such. When the set of instructions are executed, these hidden instructions generate an execution trace of various morsels of data. This implementation generates an integrity signature based upon the execution trace of the set of instructions when the set is given one or more specified parameters. This integrity signature may also be called an "execution-identifying" signature.

Other implementations may combine the features and functions of the "execution-trace" implementation and the "output-trace" implementation.

Although code obfuscation may be used to limit code accessibility and to make code modification more difficult to accomplish, the tamper-resistance (i.e., protection) afforded by this implementation enables detection of alterations to the executable instructions of a digital good. Consequently, an alternative implementation may combine code obfuscation with the integrity ordainment techniques.

Clear, Black, and Green Code

FIG. 1A illustrates an implementation of the execution-trace form of the integrity ordainment technique. Such technique strategically, distributively inserts hidden, special-purpose instructions within the existing executable instructions. These hidden instructions are called "black code," which are shown as a set of shaded blocks 120 labeled "black". The otherwise unprotected original instructions are called "clear code," which are shown as a block 110 labeled "clear." The combination is called "green code" to be metaphorically consistent. It is shown as a block 130 labeled "green." Alternatively, it is generally called "modification-detectable code."

As FIG. 1A summarizes, the combination of clear code 110 and black code 120 results in green code 130. In other words, the combination of unprotected code 110 and code implementing integrity ordainment 120 results in modification-detectable code 130.

This tamper-resistance (i.e., protection) technique, which facilitates later code-modification detection, may include code obfuscation to shield the code from malicious attacks. In alternative implementations, the clear code and/or the green code may be subject to further code obfuscation techniques. For the purposes of clarity, the tamper-resistance (i.e., protection) afforded by such code obfuscation will be largely ignored herein. That is because the focus is on providing a way to detect and to actually detect code alterations regardless of the barriers erected to prevent such alterations.

If an implementation employs only the output-tracing form of the integrity ordainment technique, then the clear code 110 and green code 130 are the same. That is because black code 120 is not employed to implement the output-tracing form alone.

Green Signature

Figure 1B:
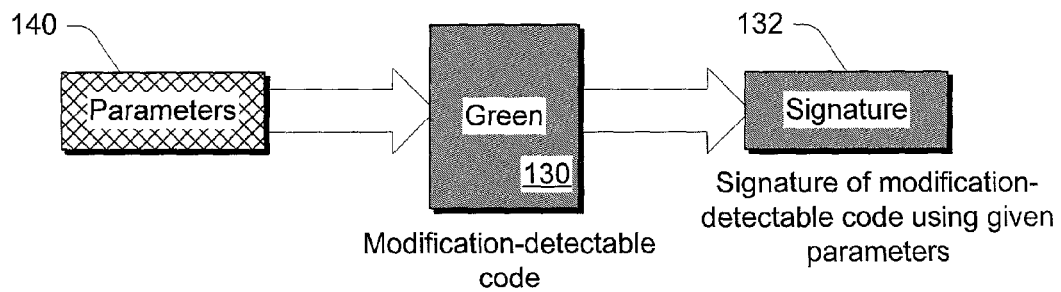

FIG. 1B shows that, during the integrity ordainment, the green code 130 is provided one or more given (i.e., known, determined, specified, etc.) parameters 140. Presumably, the green code 130 is one or more program modules that typically accept input in the form of parameters, such as parameters 140.

Typically, the actual value(s) of parameter(s) 140 are selected with the intent of a signature that is likely to change if there is a slight modification in the code With at least one implementation employing the execution-trace form, as the green code 130 executes, the black code (which is now within it) generates a trace of various status conditions. Thus, it generates an execution trace.

Given the parameters on which the green code executes, the resulting execution trace (or further computation of such trace) is effectively a "signature" of the execution instance of that green code. Generally, this may be called a green signature 132. More specifically, it may be called the green execution-signature. If the green code is modified, the resulting signature of such a modified code differs from the green signature 132 (i.e., original signature) of the green code 130.

With at least one implementation employing the execution-trace form, as the green code 130 is repeatedly executed, each time with specified input parameters. Each execution instance generates an output that is stored as an output trace.

Given the parameters on which the green code repeatedly executes, the resulting output trace (or further computation of such trace) is effectively a "signature" of the output of the execution instances of that green code. Generally, this may be called a green signature 132. More specifically, it may be called the green output-signature. If the green code is modified, the resulting signature of such a modified code differs from the green signature 132 (i.e., original signature) of the green code 130.

Red Code

To continue the metaphor further, code that has actually been modified (i.e., modification has been detected) is called "red code."

Figure 1C:
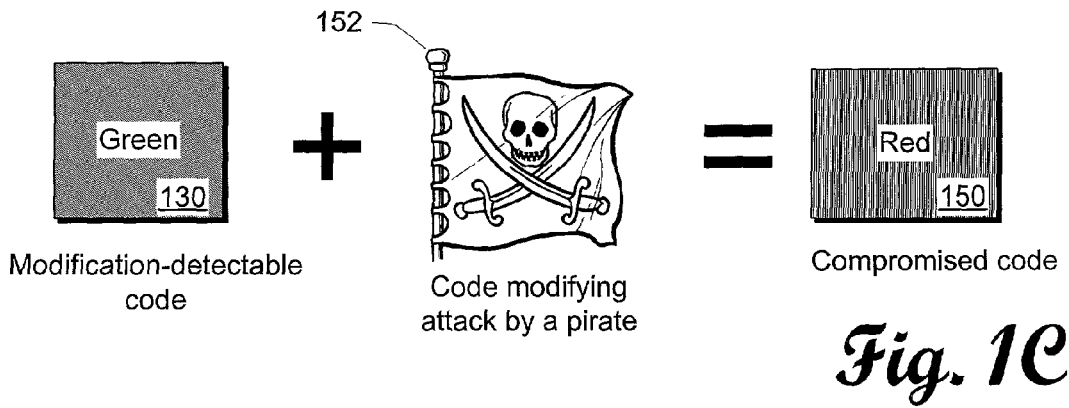

FIG. 1C shows that a malicious attack 152 by a digital pirate on green code 130 generates red code 150. The computer-executable instructions of the red code are compromised. The pirate has modified the green code (unmodified code) and produced the red code (modified code).

Yellow Code

To continue the metaphor further, code that is suspected of having been modified (i.e., it is subject of detection tests) is called "yellow code." It is not known whether such code is green or red.

Integrity Ascertainment

Another implementation verifies the integrity of a digital good. It does so by determining whether one or more computer-executable instructions of the digital good have been altered. This detection technique is called "integrity ascertainment," herein.

Like above, there are two forms of a technique generally called "integrity ascertainment:" One for execution tracing and one for output tracing. These two forms of technique may be employed together or separately of the other.

Yellow Signature

Figure 1D:
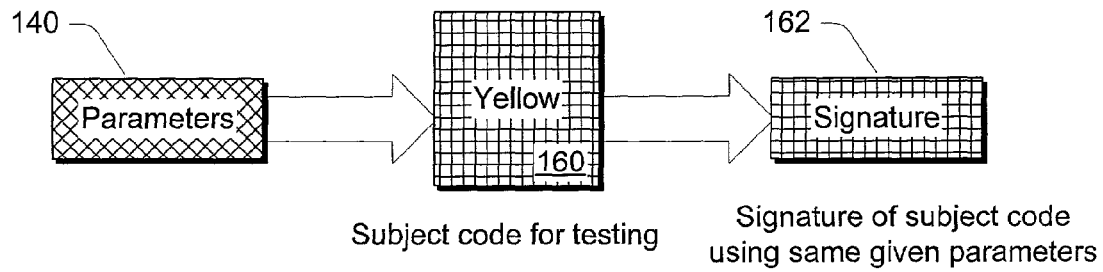

FIG. 1D shows that this implementation generates a yellow signature 162 (or "verification" signature) for yellow code 160 (i.e., the code being tested for integrity). This yellow signature is based upon an execution trace of the computer instructions of the yellow code 160. With at least one implantation, the same specified parameters 140 are used to generate both the original signature 132 (i.e., the green signature) during integrity ordainment (see FIG. 1B) and the verification signature 162 (i.e., the yellow signature) during integrity ascertainment (see FIG. 1D).

With at least one implantation, the signature may be an execution-signature that is based upon an execution trace of the execution instance of a set of instructions of a subject digital good. With at least another implantation, the signature may be an output-signature that is based upon an output trace of the execution instance of a set of instructions of a subject digital good. With at least another implantation, the signature may be either, both, or some combination of the execution-signature and/or the output-signature.

Comparison of Yellow and Green Signatures

With at least one implantation, the original signature(s) (i.e., the green signature 132) generated during integrity ordainment is/are compared to the signature(s) (i.e., the yellow signature 162) generated during integrity ascertainment.

If they are substantially indistinguishable (e.g., they match exactly), then the digital good is unmodified. Otherwise, the digital good has been modified from its original state. When the parameters are employed for integrity ordainment and integrity ascertainment are the same, "indistinguishable" here means the same or substantially so. Also, "indistinguishable" here takes into account any relationship between parameters if differing parameters are employed for integrity ordainment and integrity ascertainment.

Figure 1E:
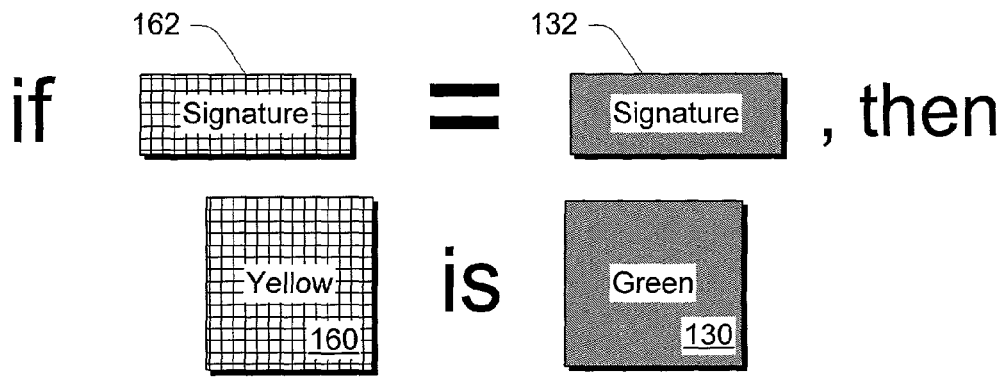
Figure 1F:
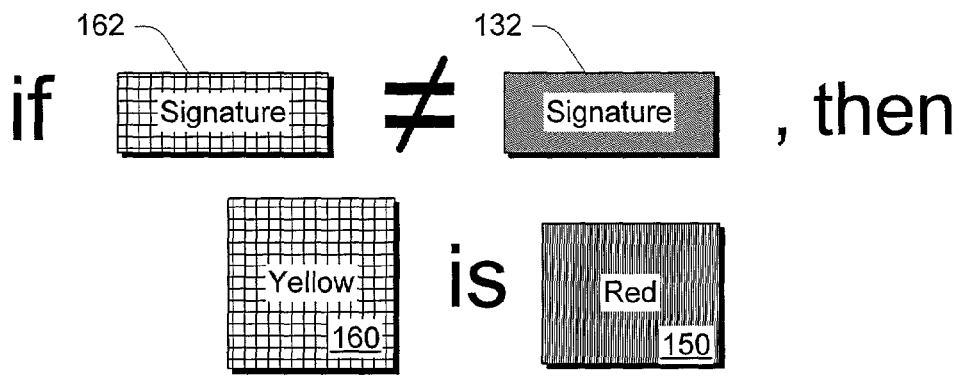

As shown in FIGS. 1E and 1F, the yellow and green signatures are compared. FIG. 1E shows that if the yellow and green signatures are indistinguishable, then the yellow code 160 is the unmodified green code 130. FIG. 1F shows that if they are distinguishable, then the yellow code 160 has been modified from the original green code. Thus, it is red code 150.

Execution and/or Output Tracing

The exemplary integrity veracitor may employ execution tracing and hashing, output tracing and hashing, or a combination of both. Generally, with execution tracing and hashing, the execution instance of a program module is traced and the result of such is hashed to generate an execution-trace signature. Generally, with output tracing and hashing, the output of a program module is traced and the result of such is hashed to generate an output-trace signature.

Execution Tracing and Hashing

With at least one implementation, the yellow and green signatures being compared are based upon an execution trace (i.e., computation trace) of one or more program modules of the digital good. The program modules include computer-executable instructions. By their nature, these instructions execute.

A typical program module receives input and that input is often labeled parameters. While a program module executes, various morsels of stored data are changed. The program module probably will change registers in the processor and data stored in memory locations. Typically, a module returns some data at the conclusion of its execution instance.

Tracking the changes in various morsels of data while a program module executes is called an execution trace, or alternatively a computation trace.

Figure 2A:
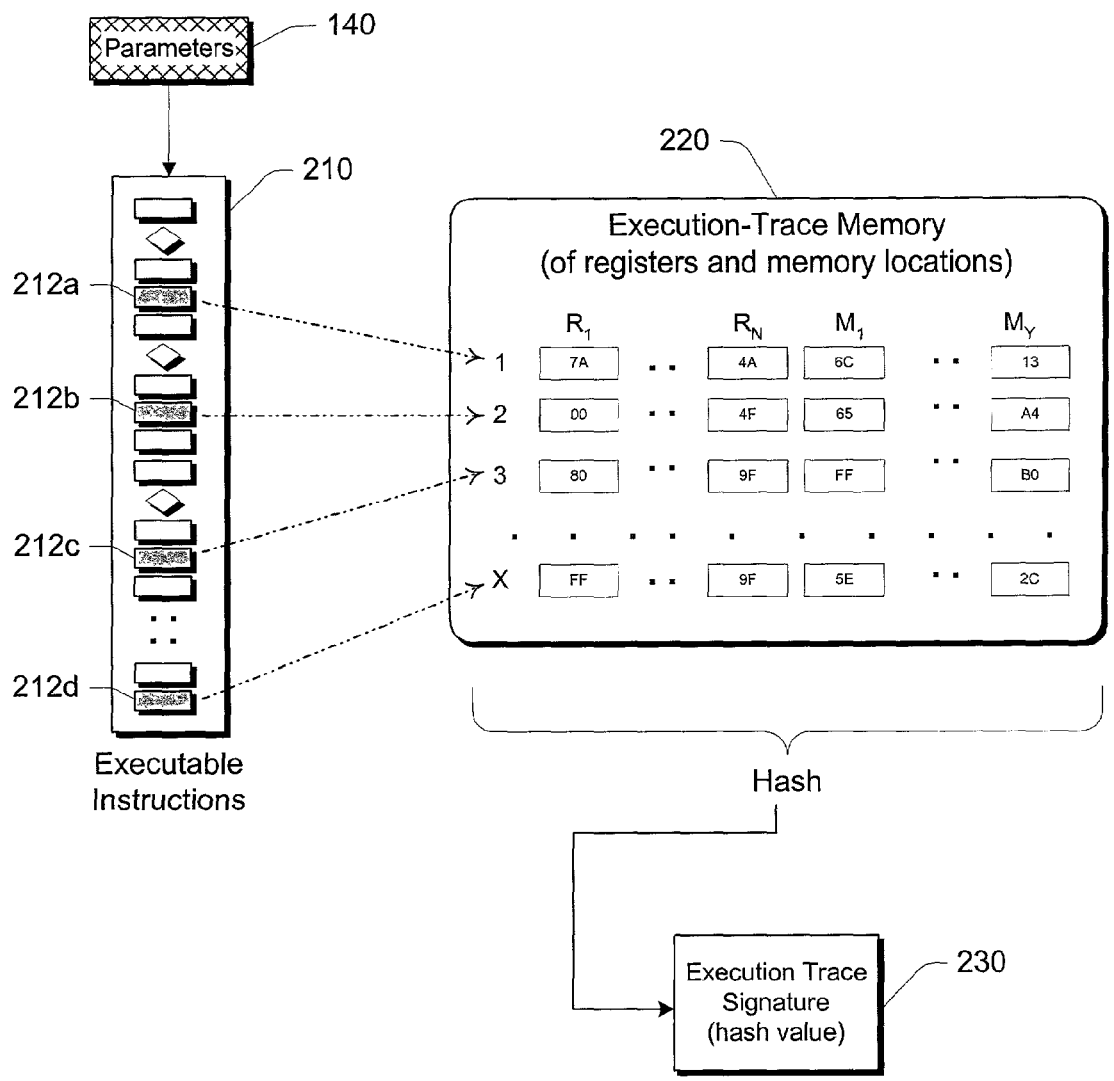
FIG. 2A is a block diagram graphically illustrating actions performed by an embodiment described herein.

FIG. 2A illustrates the execution tracing of the exemplary integrity veracitor. A program module 210 of code includes a series of computer-executable instructions (which as shown as rectangles and diamonds). If the green signature 132 is being generated (during integrity ordainment), then the program module 210 is part of green code 130. If the yellow signature 152 is being generated (during integrity ascertainment), then the program module 210 is part of yellow code 150.

For the purpose of clarity in the discussion that follows, assume that the program module 210 of FIG. 2A is part of the green code and a green signature 132 is being generated. This assumption is only for the purpose of discussion only.

FIG. 2A shows the program module 210 receiving one or more parameters 140. The program modules include the original instructions, which are unlabeled and represented as rectangles and diamonds. These instructions may be thought of as the clear code before integrity ordainment. The program module also includes several blocks of hidden code (e.g., 212a-d). These are the black code. They are strategically dispersed throughout the program module.

The black code insertion may occur at most any level of language. Examples of such levels include (but are not limited to):
 source code
 AST—abstraction syntax
 IL—intermediate language
 machine language (executable)

With this implementation, the purpose of each block of the black code is to record the present status of various morsels of data at the time that the black code is executed. Consequently, the black code records a history of the execution instance of that program module for given input parameters 140.

FIG. 2A shows an execution-trace memory 220, which simply is a block of memory where the black code stores the execution trace as it generates it and uses it.

It illustrates a simple data structure table with rows and columns. The rows (1-X) represent a set of data morsels stored by a specific block of black code—perhaps, more precisely, by a specific execution instance of a block of black code. It is likely that blocks of black code will be executed more than once. In FIG. 2, that association is illustrated by the dashed-dotted arrow between a row and a block of black code.

The columns represent each selected morsel of data that is being traced. For example, columns $R_1$-$R_N$ represent registers 1-N and $M_1$-$M_Y$ represent memory locations 1-Y.

Specific data is shown in the table of the execution-trace memory 220, but this data is for illustration purposes only and has no other significance.

The exemplary integrity veracitor hashes the completed execution trace memory 220 to produce a hash value 230. That value may be generically called an execution-trace signature.

This hashing of the execution trace may be called "computational," or "execution," hashing. It is an example of "oblivious" hashing.

Execution hashing is a technique to detect modifications in the code by examining the computations of that code, rather than the code itself. To put it another way, it is a technique to verify code integrity of the code as it executes. Thus, to perform the test, the code being tested must execute. However, the code is not tested directly; rather, an historical record of the computations performed during execution instance is tested.

To be more precise, this historical computation record is hashed to get a hash value. That hash value is compared to the expected hash value when a given set of parameters is passed to the code being tested.

Execution hashing computes hashes or checksums of intermediate program states, thus preventing easy changing of program behavior. This procedure essentially verifies code without reading code bytes, and serves to identify a particular program module. Hashes depend on the states of a program at particular times, and such states are extremely unlikely to be equivalent for distinct programs, even if the programs perform similar actions.

Output Tracing and Hashing

With at least one implementation, a plurality of input parameters to provide to a set of computer-executable instructions (e.g., a program module) of a digital good. The execution instance of the set of instructions generates an output for a specified input parameter. The outputs from multiple execution instances of the program module—with each using specified parameters—are stored in output trace. Presumably, at least some of the specified parameters from different execution instances differ from each other.

This implementation generates an integrity signature based upon the output trace. This integrity signature may also be called an "output-identifying" signature. However, more generally, this integrity signature may also be called an "execution-identifying" signature since it represents (and thus identifies) multiple execution instances of a program module.

A typical program module receives input and that input is often labeled parameters. A typical program module generates one or more outputs while it executes or upon the completion of execution instance. Typically, the output varies depending upon the input parameters.

Tracking the output from multiple execution instances of a program module, where each execution instance has a set of input parameters, generates an output trace, or alternatively, a write trace.

Figure 2B:
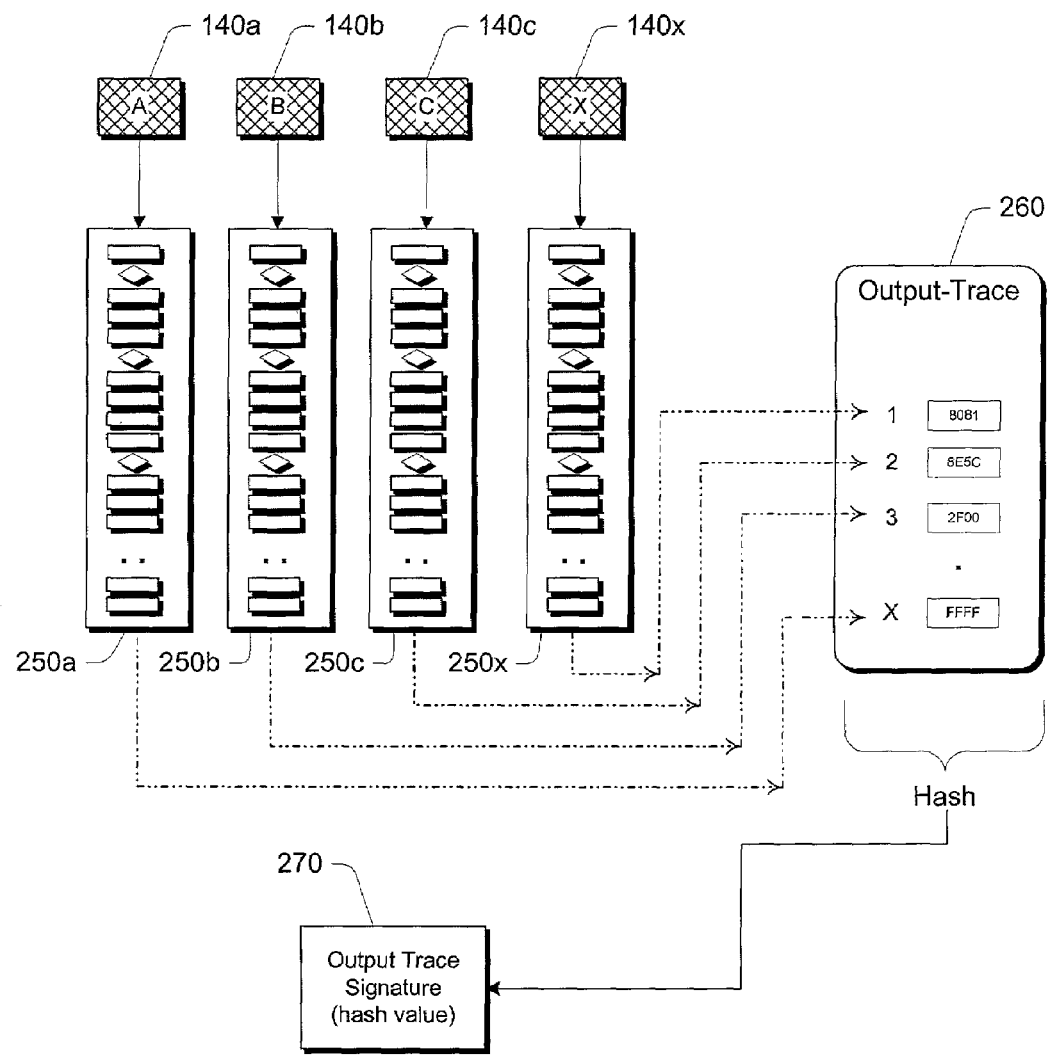
FIG. 2B is a block diagram graphically illustrating actions performed by an embodiment described herein.

FIG. 2B illustrates the output tracing of the exemplary integrity veracitor. Program modules 250a, 250b, 250c, and 250x represent multiple execution instances of the same series of computer-executable instructions (which as shown as rectangles and diamonds). If the green signature 132 is being generated (during integrity ordainment), then the program modules 250a-x are part of green code 130. If the yellow signature 152 is being generated (during integrity ascertainment), then the program modules 250a-x are part of yellow code 150.

For the purpose of clarity in the discussion that follows, assume that the program modules 250a-x of FIG. 2B is part of the green code and a green signature 132 is being generated.

FIG. 2B shows an output-trace memory 260, which simply is a block of memory where the output(s) of each execution instance is stored. Although the output trace memory may have the original input parameters (e.g., 140a-x) stored therewith, it may be undesirable to do so. That is because it may allow a digital pirate to reverse engineer the output trace process. However, this may be done if it is determined that the risk of such reverse engineering is tolerable.

FIG. 2B shows the execution instance of program module 250a receiving one or more input parameters 140a. The result is saved in block 1 of the output-trace memory 260. FIG. 2B shows the execution instance of program module 250b receiving one or more input parameters 140b. The result is saved in block 2 of the output-trace memory 260. FIG. 2B shows the execution instance of program module 250c receiving one or more input parameters 140c. The result is saved in block 3 of the output-trace memory 260. FIG. 2B shows the execution instance of program module 250x receiving one or more input parameters 140x. The result is saved in block X of the output-trace memory 260. Other execution instances may occur using other input parameters. Those outputs would be saved in the output-trace memory 260 also.

Presumably, at least one of the input parameters 140*a-x* differ from the other. It is desirable for many (to all) to differ from the others.

Specific data is shown in the table of the output-trace memory 260, but this data is for illustration purposes only and has no other significance.

The exemplary integrity veracitor hashes the completed output trace memory 260 to produce a hash value 270. That value may be generically called an output-trace signature.

This hashing of the output trace may be called "write," or "output," hashing. It is an example of "oblivious" hashing.

It is a technique to detect modifications in the code by examining the output of multiple execution instances of that code, rather than the code itself. To put it another way, it is a technique to verify code integrity of the code by validating its output from multiple execution instances. Thus, to perform the test, the code being tested must execute multiple times. However, the code is not tested directly; rather, an historical record of the outputs generated during/from the execution instances is tested.

To be more precise, this historical output record is hashed to get a hash value. That hash value is compared to the expected hash value when a specified set of parameters is passed to the code being tested over multiple execution instances.

This procedure essentially verifies code without reading code bytes, and serves to identify a particular program module. Hashes depend on the outputs of a program given specified inputs, and such outputs are extremely unlikely to be equivalent for distinct programs, even if the programs perform similar actions.

Oblivious Hashing

Although those skilled in the art are aware that other techniques are available, these implementations hash the execution-trace and/or output-trace records to generate a unique (or nearly) unique identifier for a program module. Such implementations my employ a scheme called "oblivious hashing."

With oblivious hashing scheme, the behavior of a module (i.e., function) is hashed without reading the module's code. The hashing has weak collision resistance in the following sense: given a function $f$ and its hash value $H(f)=h$, it is hard to make minor modifications to $f$ such that the resulting function $f'$ has the same hash value $H(f')=h$.

In general, those of ordinary skill in the art know how to hash a table (such as the one shown at 220 if FIG. 2A) to generate a hash value.

In general, one advantage of hashing is to generate a short and manageable identifier that represents the trace. The hash value is one that heavily influenced by any differences from one trace to another. Those of ordinary skill in the art know that other types of encoding may be employed.

Note that both the yellow and green signatures may be generated in this manner.

If the yellow code is unmodified, then the black code (e.g., 212*a-d*) will generate the same execution trace during integrity ordainment and ascertainment. Consequently, the same execution traces produce the same execution-trace signatures 230.

If the yellow code is unmodified, then the outputs of multiple execution instances will generate the same output trace during integrity ordainment and ascertainment. Consequently, the same output traces produce the same output-trace signatures 230.

The signatures that are compared to verify the integrity of the subject code are based upon traces. The green signature 132 is based upon a trace of the green code 132 (see FIG. 1B). The yellow signature 152 is based upon a trace of the yellow code 152 (see FIG. 1D).

Input-Parameter Deterministic

The exemplary integrity veracitor is particularly applicable to program modules (i.e., functions) that are deterministic with respect to input parameters and that are relatively free of side effects. This does not, however, imply purely-functional functions as in a functional language. For example, one may pass pointers to objects to a program module, as long as the objects are allocated dynamically. This allows for fabrication of a set of parameters a priori and call the target program module with an expected hash value and without worry of side effects. These program modules may be called input-parameter deterministic program modules.

If a program module is input-parameter deterministic, it is logical to conclude that the execution traces (upon which the signatures are based) of the original set of instructions would differ from a trace of a modified set of instructions. Conversely, it is logical to conclude that the execution traces of the original set of instructions would be identical to a trace of an unmodified (i.e., identical) set of instructions.

If a program module is input-parameter deterministic, it is logical to conclude that the output traces (upon which the signatures are based) of multiple execution instances of the original set of instructions would differ from a trace of a modified set of instructions. Conversely, it is logical to conclude that the output traces of multiple execution instances of the original set of instructions would be identical to a trace of an unmodified (i.e., identical) set of instructions.

Given the same set of parameters, with the exemplary integrity veracitor, distinct signatures represent the execution instance of program modules with distinct sets of computer-executable instructions. In other words, given the same set of parameters, program modules that have a different (i.e., distinct) set of computer-executable instructions have different (i.e., distinct) signatures.

DRM Distribution Architecture

A digital rights management (DRM) distribution architecture produces and distributes digital goods in a fashion that renders the digital goods resistant to many known forms of attacks or makes such attacks detectable.

Digital Goods

Essentially any type of digital good may be protected using this architecture, including such digital goods as software, audio, video, and other content. For discussion purposes, many of the examples are described in the context of software goods and in particular goods that include computer-executable instructions. However, the techniques described herein may be effective for other digital goods (such as audio data, video data, and other forms of multimedia data) if they include some form of computer-executable instructions.

Architecture

Figure 3:
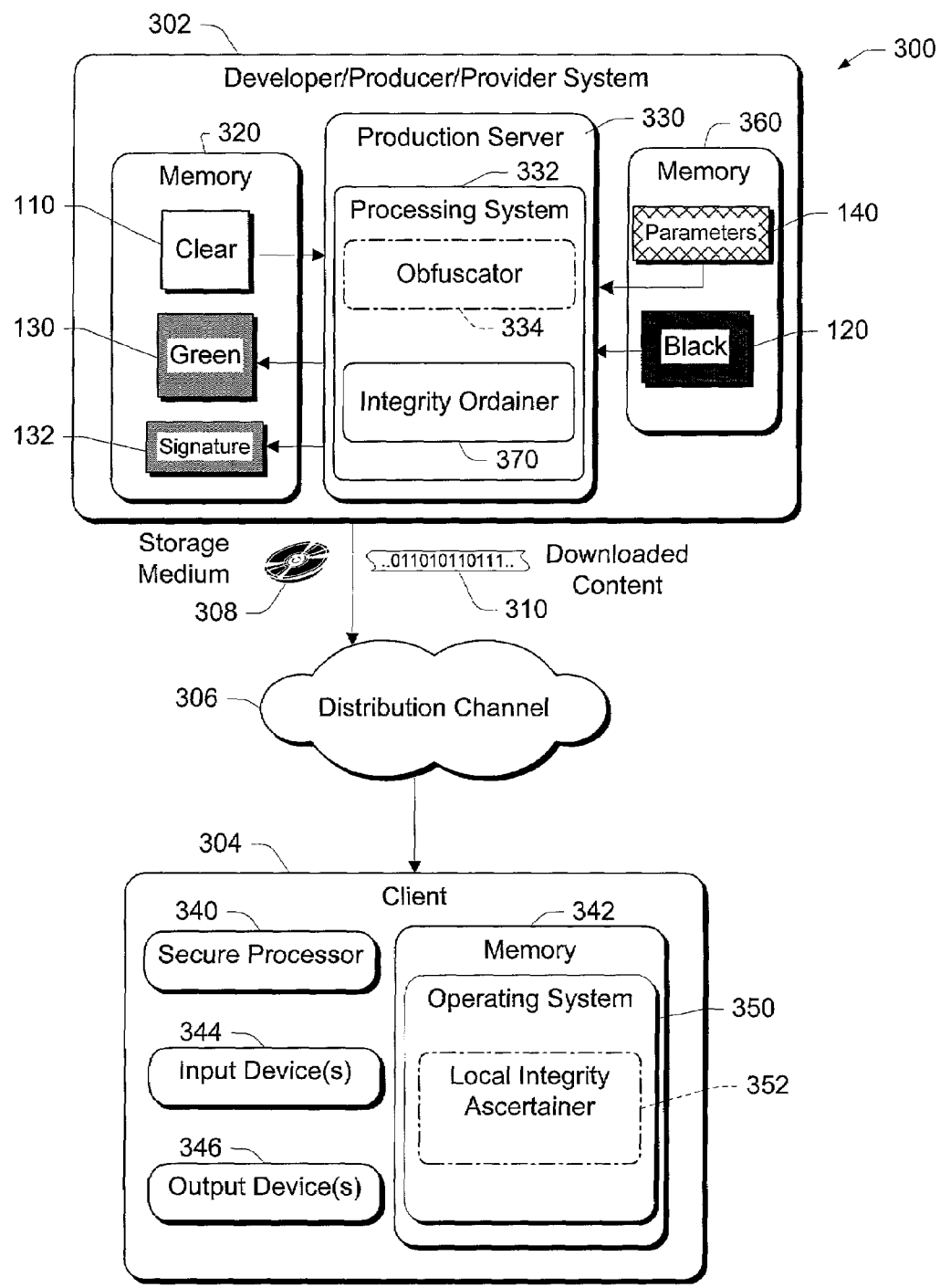
FIG. 3 illustrates an example of a digital rights management (DRM) distribution architecture in accordance with an implementation described herein. In particular, this illustrates an implementation of the integrity ordainment aspect described herein.

FIG. 3 shows a DRM distribution architecture 300 in which unprotected (i.e., modification-undetectable) digital goods are transformed into protected (i.e., modification-detectable) digital goods and distributed in their protected form. This involves the employment of integrity ordainment using execution-trace and/or output-trace forms.

The architecture 300 has a developer/producer/provider system 302 that develops or otherwise produces the protected good and distributes the protected good to a client 304 via some form of distribution channel 306. The protected digital goods may be distributed in many different ways. For instance, the protected digital goods may be stored on a computer-readable medium 308 (e.g., CD-ROM, DVD, floppy disk, etc.) and physically distributed in some manner, such as conventional vendor channels or mail. Alternatively, the protected goods may be downloaded over a network (e.g., the Internet) as streaming content or files 310.

The developer/producer system 302 has a memory (e.g., memory 320 and 360) to store an original digital good 110 (i.e., clear code), as well as the protected digital good 130 (i.e., green code) created from the original digital good. The memory also stores the black code 120, the parameters 140, and the green signature 132.

The system 302 also has a production server 330 that transforms the clear code 110 into the green code 130 that is suitable for distribution. The production server 330 has a processing system 332 and implements an integrity ordainer 370.

The integrity ordainer 370 is the exemplary integrity ordainer of the exemplary integrity veracitor, described herein.

Alternatively, the processing system 332 may include an obfuscator 334. The obfuscator 334 obfuscates the digital good. While obfuscation makes it extremely difficult for pirates to modify the original digital goods, it does not prevent it. A pirate can fool a conventional obfuscator and modify the digital good without detection.

The developer/producer system 302 is illustrated as a single entity, with memory and processing capabilities, for ease of discussion. In practice, however, the system 302 may be configured as one or more computers that jointly or independently perform the tasks of transforming the original digital good into the protected digital good.

The client 304 has a secure processor 340, memory 342 (e.g., RAM, ROM, Flash, hard disk, CD-ROM, etc.), one or more input devices 344 (e.g., keyboard, joystick, voice recognition, etc.), and one or more output devices 346 (e.g., monitor, speakers, etc.). The client may be implemented as a general-purpose computing unit (e.g., desktop PC, laptop, etc.) or as other devices, such as set-top boxes, audio/video appliances, game consoles, and the like.

The client 304 runs an operating system 350, which is stored in memory 342 and executed on the secure processor 340. Operating system 350 represents any of a wide variety of operating systems, such as a multi-tasking, open platform system (e.g., a "Windows"-brand operating system from Microsoft Corporation).

Alternatively, the operating system 350 may include a local integrity ascertainer 352 that evaluates the digital goods (i.e., yellow code) prior to their utilization to determine whether the goods have been tampered with or modified in any manner. The local integrity ascertainer 352 is the exemplary integrity ascertainer (in whole or in part) of the exemplary integrity veracitor, described herein. In particular, the local integrity ascertainer 352 is configured to analyze the various portions according to the tamper-resistance (i.e., protection) scheme of the exemplary integrity veracitor.

The local integrity ascertainer 352 includes code portions that may be executed in these most secure areas of the operating system and secure processor. Although the local ascertainer 352 is illustrated as being integrated into the operating system 350, it may be implemented separately from the operating system.

In the event that the client detects some tamper activity, the secure processor 340 acting alone, or together with the operating system 350, may decline to execute the suspect digital code. For instance, the client may determine that the software product has been modified because the evaluations performed by the ascertainer 352 are not successful. In this case, the local ascertainer 352 informs the secure processor 340 and/or the operating system 350 of the suspect code and the secure processor 340 may decline to run that software product.

It is further noted that the operating system 350 may itself be the protected digital good. That is, the operating system 350 may be modified with various tamper-resistance (i.e., protection) schemes to produce a product that is difficult to copy and redistribute, or at least makes it easy to detect such copying. In this case, the secure processor 340 may be configured to detect an improper version of the operating system during the boot process (or at other times) and prevent the operating system from fully or partially executing and obtaining control of system resources.

Figure 4:
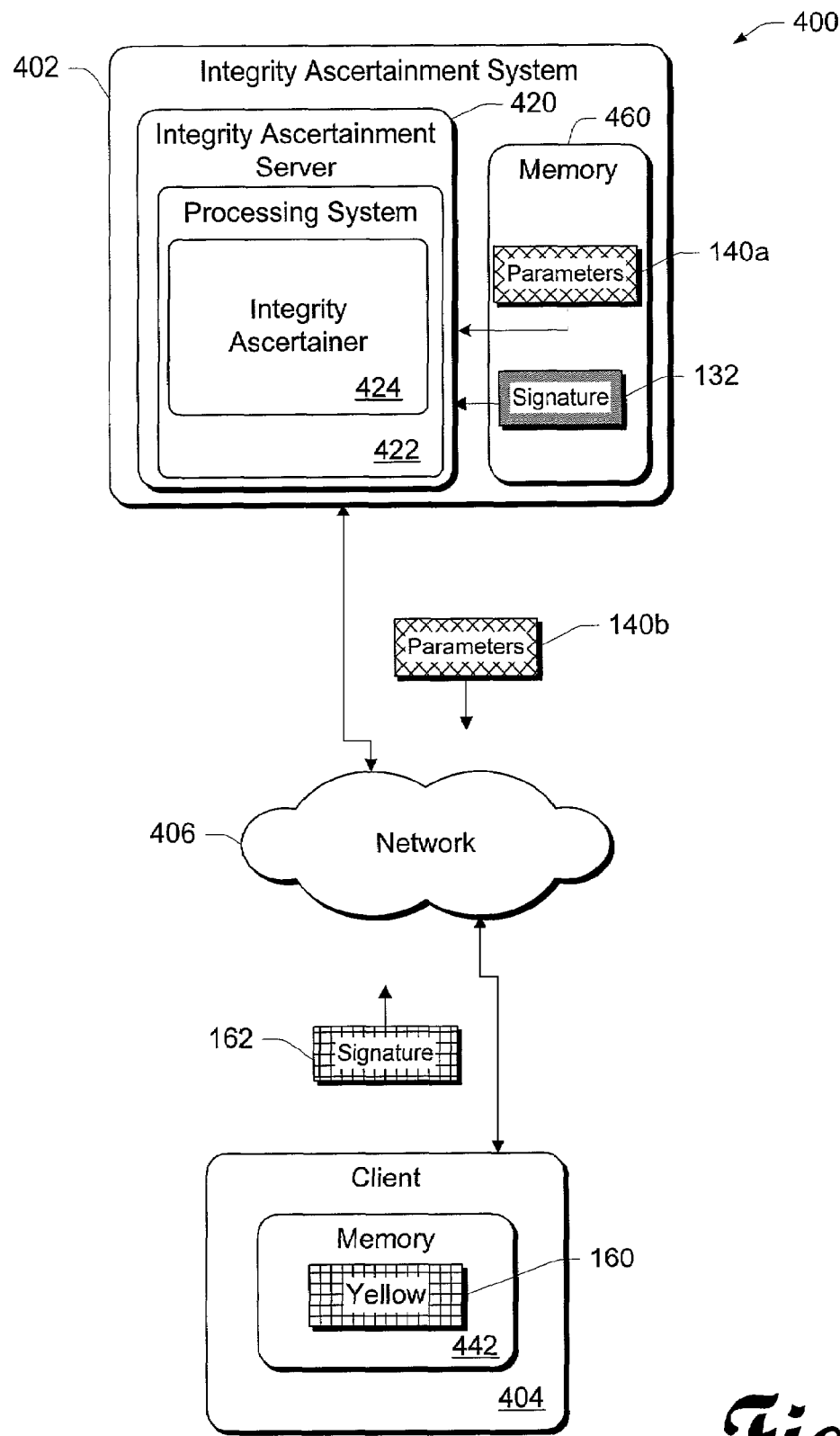
FIG. 4 illustrates an example of a digital rights management (DRM) distribution architecture in accordance with an implementation described herein. In particular, this illustrates an implementation of the integrity ascertainment aspect described herein.

For the local integrity ascertainer 352 to ascertain the integrity of yellow code, it should have a secure copy of the green signature and the parameters. Because simply having a copy of the parameters and the green signature in an inherently unsecured environment (of a client) exposes them to attack, it is desirable to have integrity ascertainment performed by or in cooperation with a system in a secure site. The system securely stores the parameters and the green signature. Such a scenario is shown in FIG. 4 and described in its accompanying description below. But, of course, local integrity ascertainment is a desirable solution when it is difficult or not possible to remotely connect to a secure site.

For protected digital goods delivered over a network, the client 304 implements a tamper-resistant software (not shown or implemented as part of the operating system 350) to connect to the server 302 using an SSL (secure sockets layer) or other secure and authenticated connection to purchase, store, and utilize the digital good. The digital good may be encrypted using well-known algorithms (e.g., RSA) and compressed using well-known compression techniques (e.g., ZIP, RLE, AVI, MPEG, ASF, WMA, MP3).

Exemplary Integrity Veracitor

FIG. 4 shows the integrity ascertainment architecture 400 in which it is ascertained whether digital goods have been modified from their original protected self. In many ways, it is directly comparable to the DRM architecture 300 of FIG. 3 except that the focus here is on ascertaining whether a good has been tampered with.

The architecture 400 includes the integrity ascertainment system 402. The integrity ascertainment system 402 has a memory 460 to store the parameters 140a and green signatures 132 for each digital good that it is configured to test.

The system 402 also has an integrity ascertainment server 420 that tests the yellow code 160 to determine if it is green or red code. The server 420 has a processing system 422 and implements an integrity ascertainer 424.

The integrity ascertainer 424 is the exemplary integrity ascertainer of the exemplary integrity veracitor, described herein.

The integrity ascertainment system 402 is illustrated as a single entity, with memory and processing capabilities, for ease of discussion. In practice, however, the system 402 may be configured as one or more computers that jointly or independently perform the tasks of ascertaining whether a digital good has been tampered.

The integrity ascertainment system 402 is coupled to a client via a network 406 (such as the Internet). The client 404 is analogous to the client 304 illustrated in FIG. 3 and described above. The client 404 includes a memory 442 storing a copy of yellow code 160.

When a client wishes to confirm the integrity of yellow code 160, it requests the assistance of the integrity ascertainer 424 of the integrity ascertainment system 402. Alternatively, the integrity ascertainment system 402 may initiate the integrity verification of the yellow code 160.

In response, the ascertainer 424 transmits the parameters (shown as parameters 140*b* in transit) over a network (such as the Internet) to the client 404. The client includes a local portion of the integrity ascertainer (as illustrated in FIG. 3). That local portion generates a yellow signature 162 using the yellow code 160 and the parameters 140*b*. The client sends the yellow signature 162 back to the integrity ascertainer 124, where the ascertainer compares it to the green signature 132.

Alternatively, the client may transmit the yellow code (or a portion thereof) to the integrity ascertainment system 402. In this case, all parts of the test are performed at the system 402, rather than partially at the client.

In the event that the exemplary integrity ascertainer detects some tamper activity (e.g., the signatures are distinguishable), it directs the client to decline execution of the tampered code.

Remote Code Verification

One implementation for the exemplary integrity veracitor is in the field of remote code verification. This is where secure access from a remote client to a server is limited to secure program modules. The server should remotely verify that the program module seeking access from the client is untampered.

A challenge-response protocol periodically requests that the client send a hash of its execution and/or output, and the server verifies the hash by executing the client code. Unlike any other existing remote verification technique, this requires the actual execution and/or output of the code being verified. Therefore, an attacker cannot modify the program to simply return some predetermined response to a given challenge.

Methodological Implementations of the Exemplary Integrity Veracitor

Figure 5:
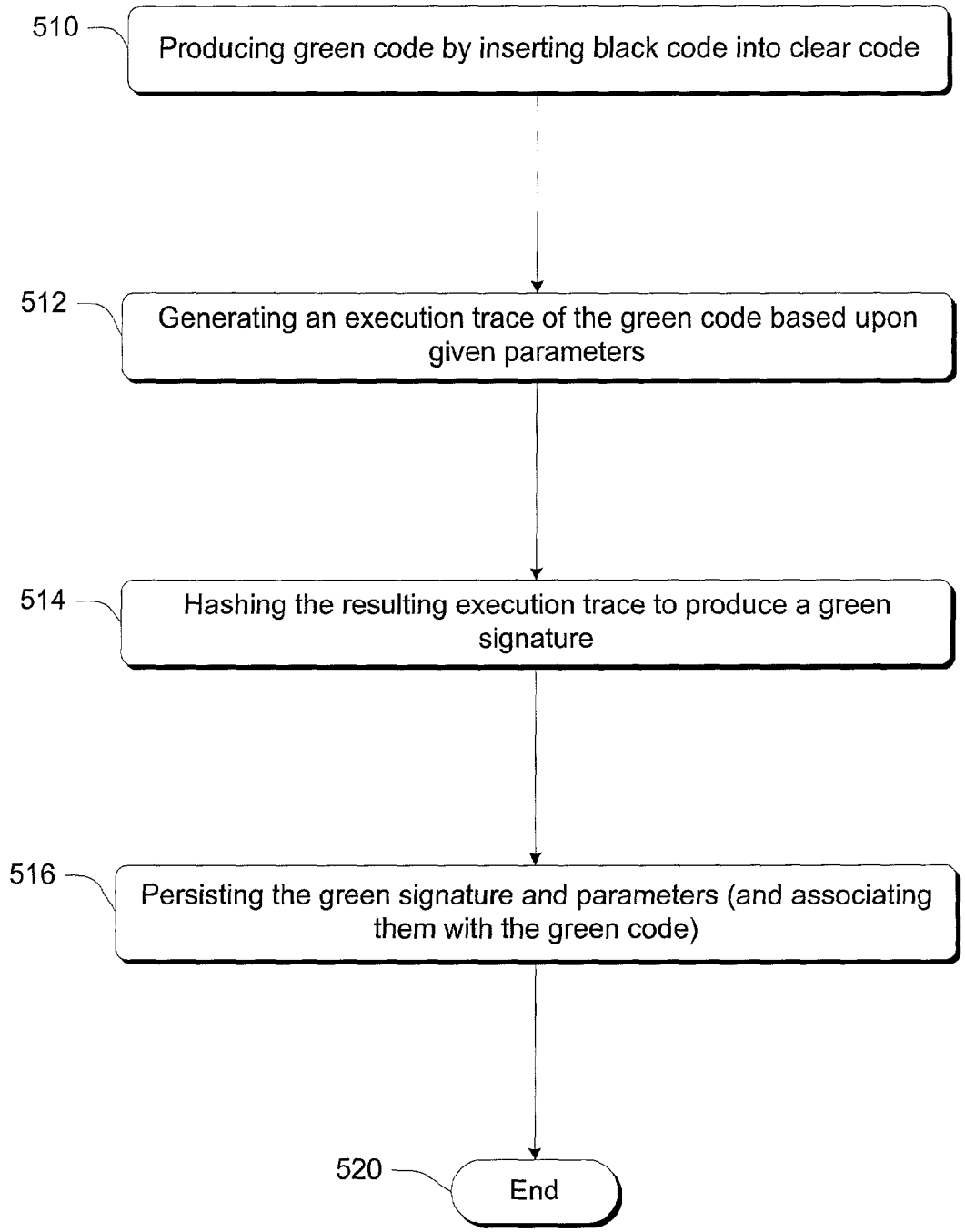
FIG. 5 is a flow diagram showing a methodological implementation described herein.
Figure 6:
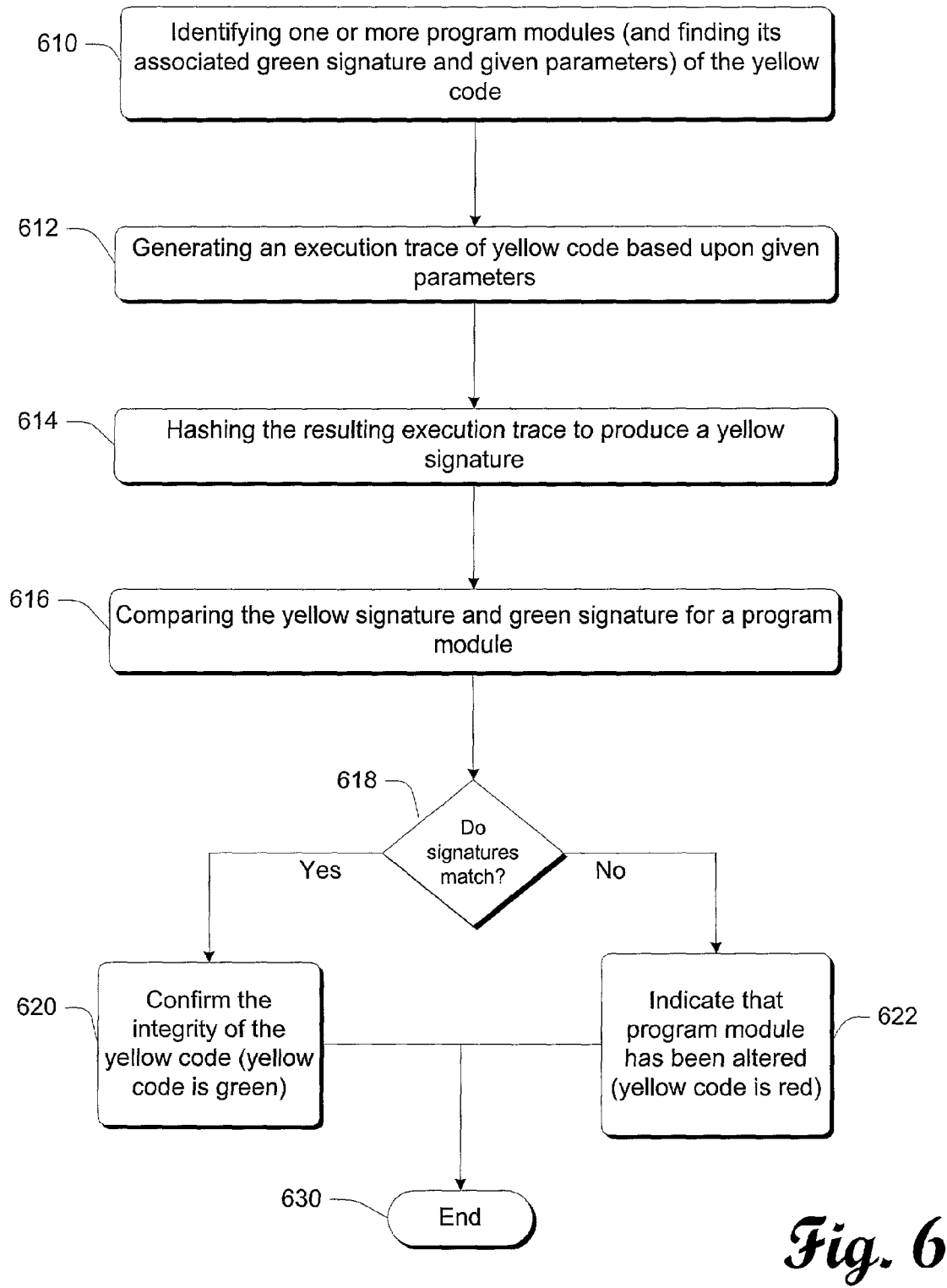
FIG. 6 is a flow diagram showing a methodological implementation described herein.

FIGS. 5 and 6 show methodological implementations of the exemplary integrity veracitor performed (in whole or in part) by an integrity veracitication system. In particular, these methodological implementations employ the execution-tracing form. These implementations may be performed by embodiments of the integrity ordainer 270; the integrity ascertainment system 302; and/or a computing environment like that shown in FIG. 9. These methodological implementations may be performed in software, hardware, or a combination thereof.

FIG. 5 shows a methodological implementation of the exemplary integrity ordainer performed (in whole or in part) by the integrity ordainer 370.

At 510, the exemplary integrity ordainer produces the green code by strategically inserting black code into the clear code. At 512, an execution trace is generated while one or more program modules of the green code are executed with given parameters.

At 514, the results of the trace are hashed to produce the green signature. At 516, the green signature and parameters are stored in association with the green code. At 520, this process ends.

FIG. 6 shows a methodological implementation of the exemplary integrity ascertainer performed (in whole or in part) by the integrity ascertainment system 402.

At 610, one or more program modules of the yellow code are identified. The associated green signature and given parameters are located. At 612, the exemplary integrity ascertainer generates an execution trace while the one or more identified program modules of the yellow code are executed with the given parameters.

At 614, the results of the trace are hashed to produce the yellow signature. At 616, the yellow signature and green signature are compared. Block 618 determines if these signatures are indistinguishable. If they are indistinguishable, then the integrity of the code is confirmed at 620. If they are distinguishable, then it is indicated that the code has been tampered with at 622. See FIGS. 1E and 1F for visual representation of blocks 616-622.

At 630, this process ends.

Other Methodological Implementations of the Exemplary Integrity Veracitor

Figure 7:
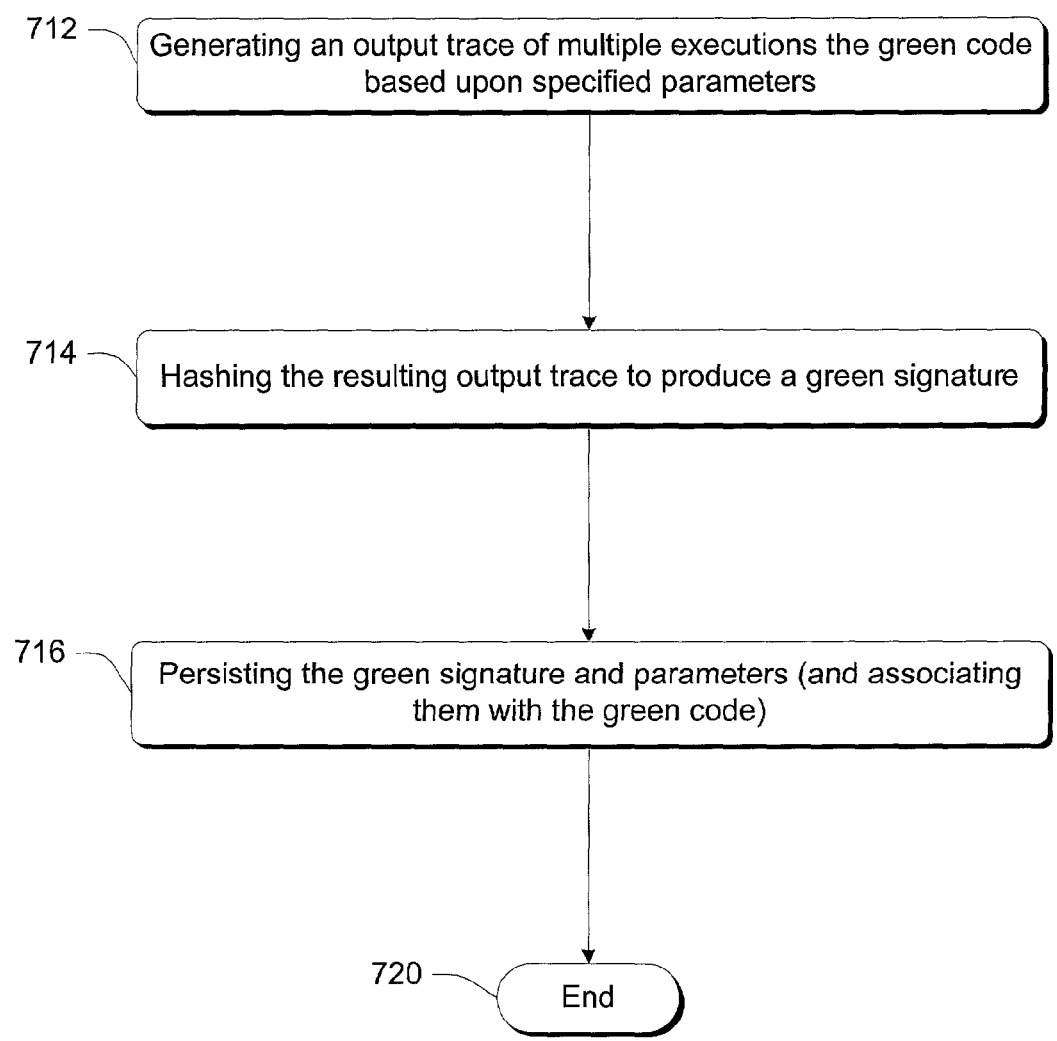
FIG. 7 is a flow diagram showing a methodological implementation described herein.
Figure 8:
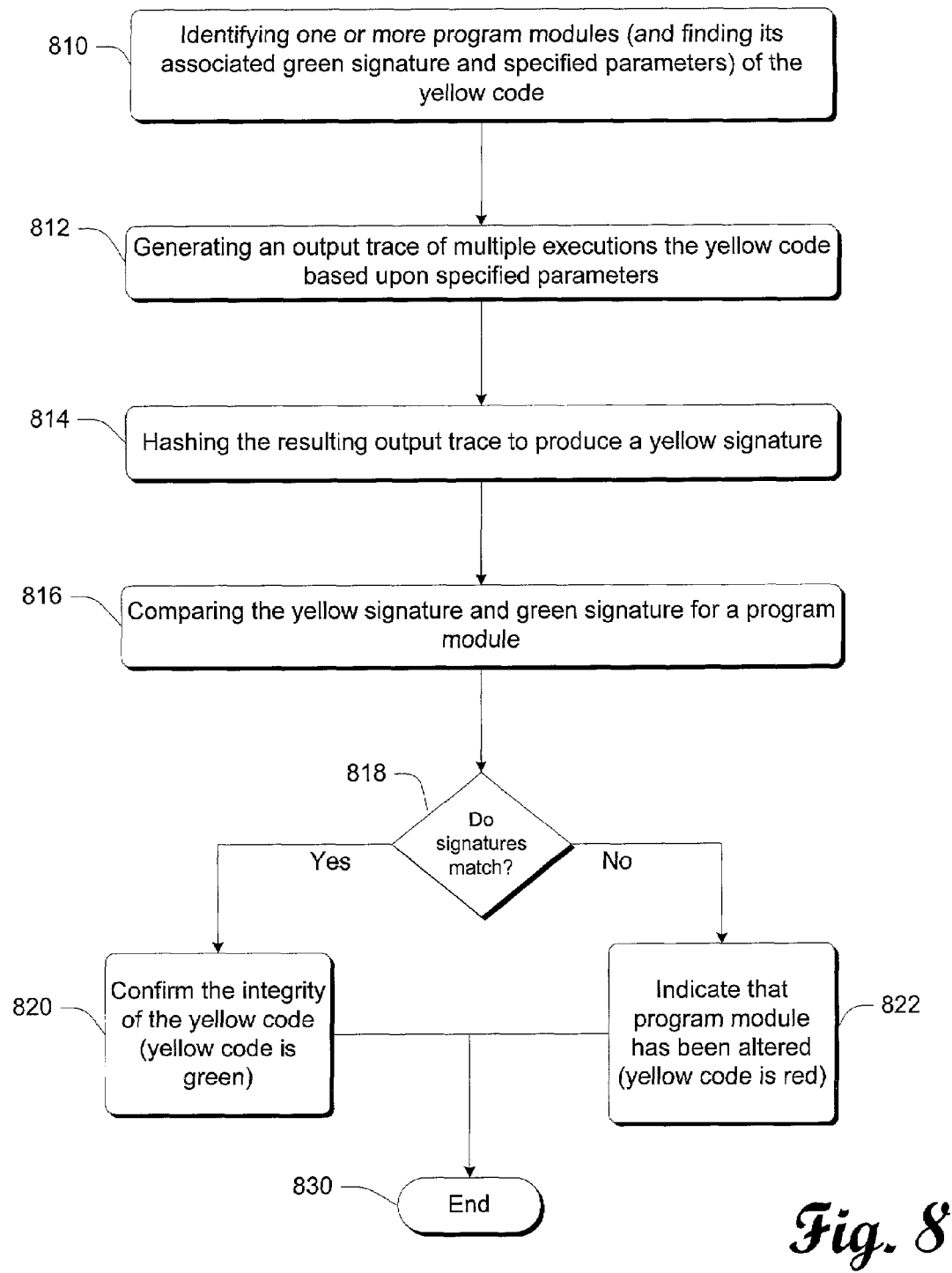
FIG. 8 is a flow diagram showing a methodological implementation described herein.

FIGS. 7 and 8 show methodological implementations of the exemplary integrity veracitor performed (in whole or in part) by an integrity veracitication system. In particular, these methodological implementations employ the output-tracing form. These implementations may be performed by embodiments of the integrity ordainer 270; the integrity ascertainment system 302; and/or a computing environment like that shown in FIG. 9. These methodological implementations may be performed in software, hardware, or a combination thereof.

FIG. 7 shows a methodological implementation of the exemplary integrity ordainer performed (in whole or in part) by the integrity ordainer 370.

At 712, the exemplary integrity ordainer generates an output trace of multiple execution instances the green code based upon specified parameters.

At 714, the results of the trace are hashed to produce the green signature. At 716, the green signature and parameters are stored in association with the green code. At 720, this process ends.

FIG. 8 shows a methodological implementation of the exemplary integrity ascertainer performed (in whole or in part) by the integrity ascertainment system 402.

At 810, one or more program modules of the yellow code are identified. The associated green signature and specified parameters are located. At 812, the exemplary integrity ascertainer generates an output trace of multiple execution instances the yellow code based upon specified parameters.

At 814, the results of the trace are hashed to produce the yellow signature. At 816, the yellow signature and green signature are compared. Block 818 determines if these signatures are indistinguishable. If they are indistinguishable, then the integrity of the code is confirmed at 820. If they are distinguishable, then it is indicated that the code has been tampered with at 822. See FIGS. 1E and 1F for visual representation of blocks 816-822.

At 830, this process ends.

Exemplary Computing System and Environment

Figure 9:
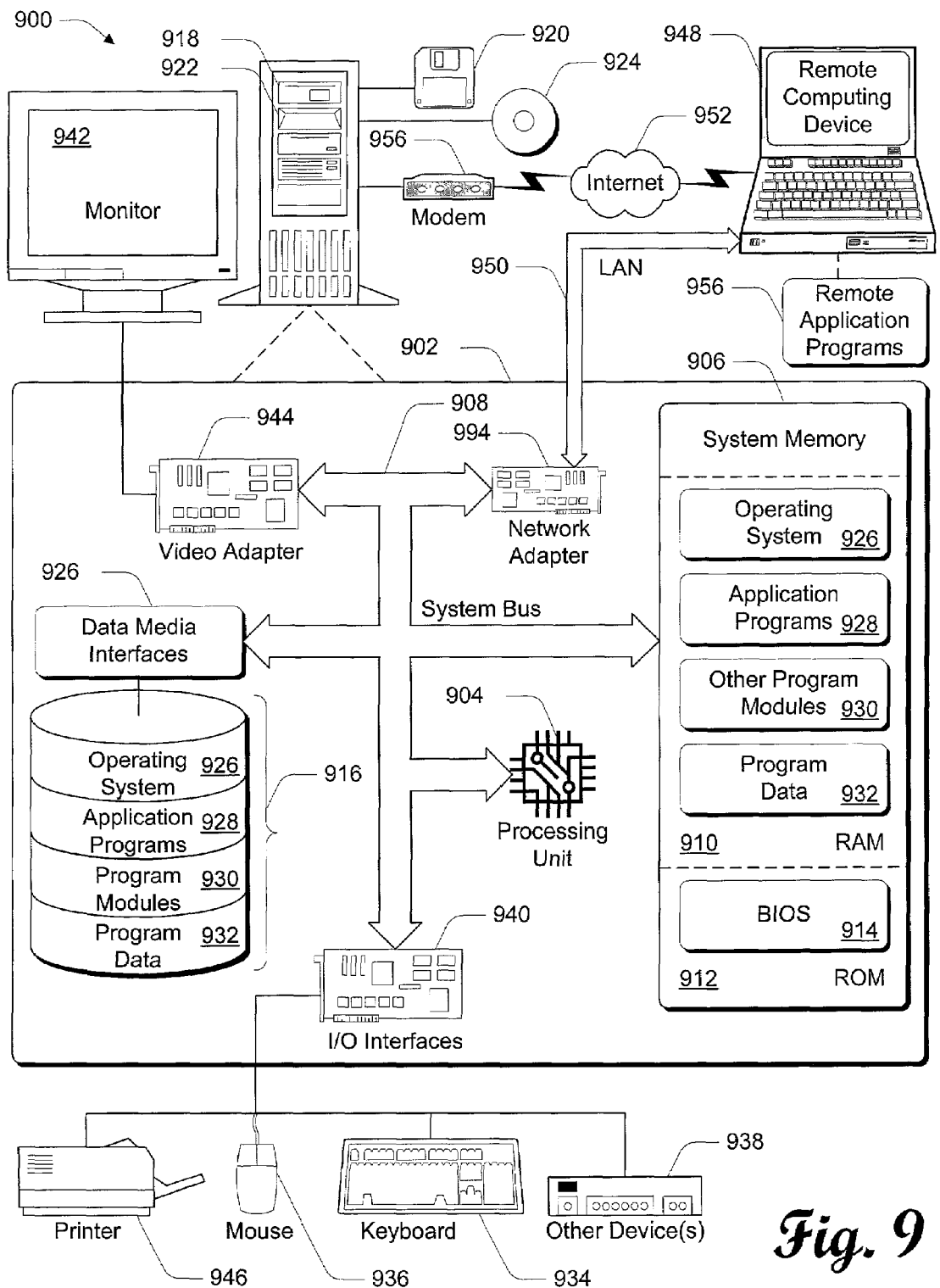
FIG. 9 is an example of a computing operating environment capable of implementing an embodiment (wholly or partially) described herein.

FIG. 9 illustrates an example of a suitable computing environment 900 within which an exemplary integrity veracitor, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary integrity veracitor may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary integrity veracitor may be described in the general context of computer-executable instructions, such as program modules, being executed by a computer. Generally, program modules include routines, programs, objects, components, data structures, etc. that perform particular tasks or implement particular abstract data types. The exemplary integrity veracitor may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide nonvolatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of challenger, response-receiver, authenticator, integrity ordainer, and integrity ascertainer.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary integrity veracitor may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 9 illustrates an example of a suitable operating environment 900 in which an exemplary integrity veracitor may be implemented. Specifically, the exemplary integrity veracitor(s) described herein may be implemented (wholly or in part) by any program modules 928-930 and/or operating system 926 in FIG. 9 or a portion thereof.

The operating environment is only an example of a suitable operating environment and is not intended to suggest any limitation as to the scope or use of functionality of the exemplary integrity veracitor(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary integrity veracitor may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Other Implementation Details

The focus of this section is on "remote code verification." However, these implementation details are applicable to other implementations of integrity ordainment and ascertainment of computer-executable instructions.

Persistent Remote Authentication

Some applications, such as Internet instant-messaging systems, include a small, simple client program that connects to a (physically) secure server over a network. Deployers of such systems may require that only authorized, unmodified client software use the servers. However, a pirate may reverse engineer the client-server communications without great difficulty and create a fully functional but unauthorized client program. Moreover, a pirate can patch the code or data of an original, authorized client in order to have it perform unauthorized actions.

This raises the question of how a server can ensure that only authorized clients connect and that such clients remain free from tampering. This problem may be called "persistent remote authentication." It may also be called "remote code verification."

Traditional authentication protocols do not address the problem described, because unauthorized parties can reverse engineer such protocols and write new software to implement them. Furthermore, traditional protocols do not deal with code tampering; an attacker can modify a client program's code or data without changing its implementation of an authentication protocol. To take into account both of these issues simultaneously, a new approach is necessary.

The exemplary integrity veracitor may be implemented to provide a persistent-authentication technique that addresses the problems presented. The technique includes a challenge-response authentication protocol combined with code execution and/or output ordainment and ascertainment. Oblivious hashing (OH) is the form of code execution and/or output ordainment and ascertainment, described hereafter.

Briefly, the challenge-response protocol periodically requests that the client send a hash of its execution and/or output, and the server verifies the hash by executing or simulating the client code.

Oblivious Hashing of a Function

This subsection describes some details of a scheme for oblivious hashing. The technique converts a function into a protected version automatically or semi-automatically by adding code. One can do this at the source-code level (by parsing source files, inserting code, and recompiling) or at the binary level (by analyzing an executable with a tool and injecting code and data).

As described herein, the technique concentrates on a tool-based approach of inserting extra instructions and calls for hashing and checking a function's state. A function can verify itself by making recursive calls with appropriate inputs; alternately, calls injected into other functions can perform the verification.

With this oblivious hashing (OH) technique, a function's behavior is hashed without reading the function's code. The hashing has weak collision resistance in the following sense: given a function $f$ and its hash value $H(f)=h$, it is hard to make minor modifications to $f$ such that the resulting function $f'$ has the same hash value $H(f')=h$.

OH Infrastructure

Spy variables (S-vars)—these are global variables that provide secure storage for values. If a value is stored in an s-var, it has very high tamper resistance. Implementation of spy variables will be discussed later.

Spy loops (S-loops)—these are loops in the program that can be called in a controlled fashion (e.g., they can be called wherever needed). Note that a loop from the original program is likely not to serve the purpose, because of its side effects. Often an S-loop is a redundant dummy loop inserted into the program, whose redundancy is hard to detect through simple analysis. One way to achieve this is to have the loop call an arbitrary function $\gamma$ and its inverse $\gamma^{-1}$, in succession, on a spy variable. S-loops are not necessarily traditional 'for' or 'while' loops, but rather arbitrary execution sequences that form loops; such sequences can include many functions at various nesting levels, and can be difficult to detect as loops.

Automatic generation of coverage data—Given a 'small' sized function $f$, it should be possible to generate, automatically or semi-automatically, a set of inputs I, such that the union of the execution paths forced by these inputs covers all statements in the function.

Oblivious Hashing

Given a function $f$ to be hashed,

Insert, at strategic points in $f$, "capture" instructions (C-instructions) that load "snapshots" of function state into special registers or variables.

C-instructions are normal instructions that modify registers and/or memory. Any clever attack should detect all of these first.

Removal of a C-instruction is not a valid attack—an attack should make the modified function produce the same snapshots. This is because the hash value is dependent on the snapshot values, and the attack should achieve the same hash value for a modified function.

One possible attack is to hardwire the C-instruction to record the expected snapshot—such hardwiring becomes infeasible if there are many possible snapshots at the same point; if all possible inputs to the function are not known, this attack may fail.

Another attack is to insert appropriate instructions after the last C-instruction—this attack can be effective, but the adversary should go through the entire function, detect all the C-instructions, and copy all other instructions. Thus this attack can be expensive.

A "snapshot" is a set of register and flag values that were (potentially) modified since the last snapshot. In other words, it is a row in the table of the execution trace shown in FIG. 2A. This snapshot may be discovered by a simple static analysis (conservative) (e.g., to detect the appropriate registers one only has to detect register defs in a basic block).

An efficient implementation for taking the aforementioned "snapshot" can be achieved by inserting instructions after every assignment, branch, and procedural call. This insertion can best be done in the intermediate representation (i.e., syntax tree) of the source program. In addition, each instance of inserted "snapshot-taking" function need not be a cryptographically strong function. It can be as simple as the following form: H=H op V, where H is the variable holding the hash value and V is the value of the assignment, or branch condition, or function call result expression, and op is randomly chosen from a pre-determined set of arithmetic and logical operators. Note that even though each snapshot-taking function is simple, a sequence of these functions, randomly chosen when the program is being compiled, but otherwise fixed afterwards, provides a strong means to hash the execution instance of a procedure.

The snapshot can be loaded into global variables created specially for this purpose. Such variables should be referenced with secrecy (e.g., through pointers). Spy variables could be used for this purpose. The other option is to use an extra argument (local variable—on the stack) to store the snapshot in. This can be slightly tricky to implement, but it is stealthier, since it is very common for functions to access parameters passed on the stack.

Having augmented $f$ (as above) to capture its state at different execution points, the exemplary integrity veracitor inserts calls to $f$ at strategic points in the program. Such calls may be referred to as "hashing calls". These calls are made with specially chosen input values so that among them they force most of the possible execution paths in $f$ to be exercised.

A hashing call is typically an indirect call. It takes its target address from a global variable, which has been set to the address of $f$ a priori. This is done in the "preparation stage" of the hashing call—a small piece of code that dominates the call, but is not very close to the call, and preferably in another function. Potentially, the same global variable can serve to hold the target address for all hashing calls to $f$, but its reference pattern may become conspicuous. It is desirable to test if normal code has several indirect calls through the same variable.

A hashing call captures the function behavior on the given input, and loads it into some variables. These variable values will be called the "output" of $f$ (on the corresponding input), and be denoted by $f(i)$ where i is the input. The point where a hashing call is made is called a hashing caller. Such callers have the following general behavior—

$i \leftarrow S_i$
$o \leftarrow f(i)$
$o \leftarrow g(o)$
$S_j \leftarrow o$ $S_i$ and $S_j$ are arbitrary but pre-determined S-vars. Each caller takes the input from an S-var, calls $f$, processes the output in some way (the function g), and stores it in another S-var, to be picked up later by some other caller. i and o are abstract temporaries, they may or may not be actual registers or memory.

A hashing caller (defined above) may or may not be a separate function. If it is, it will be amenable to oblivious hashing itself, but will also be more prominent (less stealthy) than when it is part of another function.

Now that the hashing calls have been described, the oblivious hashing scheme will be described. Given the function $f$, the scheme produces a hash of this function, $H(f)$, which changes if $f$ changes behavior.

Let $H^f$ be the set of all hashing callers of $f$. They may be implemented as separate functions that are called from inside an s-loop. For a particular input i, some subset of $H^f$ becomes "active", in the sense that only active callers are actually executed. The active ones in the above diagram are shaded in blue, and are named $h_1$ through $h_4$. The sequence of events is:

The value i is written into a spy variable $S_j$.

The s-loop containing $H^f$ is called. Each $h_i$ contains a hashing call to $f$. However, not all $h_i$ are active, and only the active ones are actually called from inside the loop.

Each $h_i$ modifies a pre-determined S-var, and the next $h_j$ to be executed automatically picks up its input from there.

After the s-loop executes, the last modified S-var is produced as output, H. the pair $\{i,H\}$ is the required hash value.

One aspect of this scheme that has not been discussed yet is how to choose input value i so that most of the possible execution paths in $f$ are exercised. This may be done as follows (by way of example and not limitation):

A set of inputs $I=\{i_1, i_2, \ldots i_k\}$ is chosen that forces most execution paths in $f$ to be exercised.

Suppose the total number of hashing callers intended multiplied by the number of times each is executed is n. I is a cardinality n (i.e., k=n). I is stored in the form of an array.

Now, the behavior of a hashing caller, as described above, is modified to be:
$i \leftarrow S_i$
$index \leftarrow R(i)$
$i \leftarrow I(index)$
$o \leftarrow f(i)$
$o \leftarrow g(o)$
$S_j \leftarrow o$
(i.e., instead of using $S_i$ as input directly, the hashing caller uses it to index into I, and gets the actual input from there.)

Note: The $S_i$ and $S_j$ mentioned above will be different for different i, since each i defines a unique set of fixed intermediate values. In fact, each $S_i$ could be an array element, indexed by i.

Spy Variables

A spy variable (S-var) is a global variable where predetermined values (such as those encountered in checksum computations) may be stored in a secure (tamper resistant) and stealthy (inconspicuous) manner. The basic idea behind S-vars is the following: Suppose I want to store the constant value v securely. If I can integrate this constant v into the rest of the program so that it is needed for the correct execution of the program, then the value becomes secure—tampering can result in unpredictable results, and since the variable is referenced by the main program (as opposed to the added security code), it is not conspicuous.

However, this simple idea is not trivial to implement. First of all, it is not apparent how an arbitrary value may be integrated (inconspicuously) into a given program. Secondly, one has to be wary of fairly simple constant-propagation kind of analyses—these may reveal constant values being used. S-vars are a means to integrating a pre-determined value into the main program.

S-vars may be implemented as follows (by way of example and not limitation):

If global variables $S_1$ and $S_2$ are known to have pre-determined values $v_1$ and $v_2$ at point P in the program and thereafter. Also, let $v_{diff}=v_1-v_2$. Clearly, $v_{diff}$ is a known constant.

Suppose static analysis shows that there is a function g that is called after point P, and cannot be called before point P is reached. Let a be one of the arguments of the call to g.

In every call to g, the argument a is replaced by $(a+S_1)$. Inside the body of function g, the following code is inserted in the very beginning: $a \leftarrow (a-S_2-v_{diff})$. Clearly, the semantics of function g are preserved.

The key observation is that the adversary does not know that $S_1$ and $S_2$ have fixed pre-determined values. They look like ordinary variables, set in one region of the program and referenced in another. Hence, attacks based on constant propagation are ruled out.

Generation of Coverage Data

Knowledge of a particular function's inputs and actions can greatly help with generating coverage data. One can specify the types and possible values of inputs, and rely on a tool to generate specific input data. This manual process can accelerate and simplify the task at hand, although in an ideal setting, coverage-data generation would be fully automatic.

Mini-Implementation

Below are the details of a "mini-implementation" of the oblivious hashing scheme, assuming tool-based code injection into a binary.

Input:

A program binary B.

A function $f$ in B that is to be hashed—$f$ is indicated by a name prefix, "hash_this"

A point p where the hash is to be computed, i.e., where the check is to be placed. p is marked using a special label "INSERT_CHECK_HERE:".

Output: Modified program B', with added code for oblivious hashing of $f$, and for computing the checksum (of $f$) at point p.

Assumptions:

The function $f$ is completely free of side effects (purely functional).

The function $f$ has no indirect memory references.

While such assumptions often do not hold in real code, oblivious hashing can simply ignore the parts of the state that cannot be hashed (e.g., because they change unpredictably). In order for hashing to work well, such state components are not critical to security.

Steps:

Scan B for $f$ and p.

Analyze $f$, determine what constitutes an "input" to $f$, and create an array of inputs I that force most execution paths to be exercised. This step is done manually as of now. One way to facilitate this is to use visual representation tools displaying the function structure.

Add C-instructions to $f$.
  First, decide which points need C-instructions. Each register def has a C-instruction associated with it, and at a point where the register is still live.
  Maintain a list of unrecorded register defs at every point in the function.
  Traverse the CFG of basic blocks in a breadth first manner.
  The unrecorded register list at the end of a block is "transferred" to the children (children does not include call targets.)
  If a block has no children, or its children have already been handled, the register list is emptied (recorded).
  Recording a register list need not be a sequence of move or add instructions.
  It could be some random operations that reads each of the registers in the list, and copies the result on to the recording variable.
The recording variable is a variable allocated on the top of the stack.
  Expand the stack by one word: i.e., the C-instructions will store the "snapshot" in a word just above the stack.
  The register esp typically points to the top of the stack (except during a function call, when it is first raised during the push-es and then lowered (add esp,.) after call). Thus in order to write "above" the top of the stack, it is simply written at dword ptr [esp-4].
  During function calls should not overwrite that word. It should be pushed on to the stack before the function call. The other option is to save it in global variables during calls.
Create a function h as follows (by way of example and not limitation):
  It has a single argument (i)
  There is a dummy loop in the body that applies a function $\gamma$ followed by $\gamma^{-1}$ on a global variable S. $\gamma$ is a manually designed pre-determined function. S is a specially allocated global variable. The number of times the loop executes is obtained from the last four bits of i.
  The loop has calls to functions $h_j$, conditioned on specific bits of i, and with three arguments—the addresses of the S-var where the $h_j$ gets its input from, and where it stores its output, and the address of $f$. The third argument could be in the form of a global variable $S_j$.
Insert a call to h at point p. Use i as argument. (i is stored a priori in a global variable.)
Insert the bodies of the functions $h_j$ at different places in B. Each function $h_j$ looks like this:
  One argument gives it the address of the variable that stores its input. It fetches the input i from that address.
  It converts i into a suitable index to fetch the actual input from the array I. The actual input is then fetched into i.
  It calls $f$ (i). It gets the address of $f$ as an argument too.
  It uses the known offset of the snapshot on $f$'s stack to fetch the "output" of $f$. It applies some transformations to this value and stores it in a fixed address $S_j$. This address is obtained in the form of an argument to $h_j$.
Simulate the call to h. Examine the final values of all the $S_j$s. Let these be denoted by $v_j$. Use pairs of such $v_j$s to create S-vars as described above. Store these $v_j$s in the appropriate S-vars.

A Protocol for Persistent Remote Authentication

This subsection presents the details of our persistent-authentication protocol. The scheme provides an example of how oblivious hashing can be used to protect a specific algorithm.

Scenario: Server S, Client C, program P.

S gives C a (potentially modified) copy of P. Let us call this copy $P_c$. C executes $P_c$. There is a communication channel CS between C and S.

Requirements: A communication protocol between S and C by which S can infer the following:
  That the other communicating party is a program issued by S. (Authentication)
  That the communicating party is $P_c$—if the latter were replaced by another program or a modified program $P_c'$ then S would detect the change. (Tamper-resistance)
  That a certain function $f$ in $P_c$ was executed on C.

Scheme:
  C sends S its hardware id h.
  S uses h to create a secret key $K_h$. S then uses $K_h$ to create a randomly individualized version $P_c$ of P.
  S sends C the program $P_c$.
  Periodically, S sends a challenge x to C, via channel CS.
  Upon receiving a challenge x C performs some actions, and sends a response r(x) to S.
  S verifies that the response from C.

Challenge-Response Schemes

The input x is treated as a concatenation of two numbers $x_1$ and $x_2$ (of known lengths). The response, likewise, is a concatenation of two responses—$r_1(x_1)$ and $r_2(x_2)$.

Computing $r_1(x_1)$—A coin is tossed, using $x_1$ and h as seeds. Based on the result of the coin toss, the response is computed by one out of two schemes $S_1$ and $S_2$ with probabilities p and 1-p respectively. The schemes $S_1$ and $S_2$ are described shortly. Since the server knows x and h, it knows the result of the coin toss (remotely), and therefore knows which kind of challenge-response to expect. Scheme $S_1$ is used with a very high probability p—the server can compute the expected response in this scheme very efficiently. Scheme $S_2$ is deployed with a relatively low probability 1-p—computing its response involves executing (a part of) $P_c$—this puts a much higher load on server S.

Scheme $S_1$

A cryptographic function R resides secretly in $P_C$. It is thoroughly integrated with $P_c$, so it is hard to isolate and determine this function. One has to execute (a part of) $P_c$ to execute R. In scheme $S_1$, the response $r_1(x_1)$ is the output of the function R on input x. The function R is individualized for client C—it uses some unique constants that are secretly hard-wired into it—so that $R(x_1)$ is different for different clients. An implementation of R is merged so thoroughly with the original code $P_c$ that to unravel it requires manually examining most of the code.

The response of this scheme is simply the value $R(x_1)$, or more precisely, $R(x_1, K_h)$, since R is individualized for C using key $K_h$. The server can efficiently compute this value since it knows $K_h$. This scheme meets requirements (1) and (2) in a weak sense. A functionally equivalent version of $P_c$ will be detected by the server, but minor changes in $P_c$ that do not change R will not be detected.

Scheme $S_2$ $x_1$ specifies a path in the execution of $P_c$, and $r_1(x_1)$ captures (a hash of) the intermediate program states. This meets requirements (1) and (2) in a robust manner—even minor changes in $P_c$ can be detected in the response computed. Moreover, by having the function $f$ called in the course of the executed path, requirement (3) may also be met. The flip side is that this scheme requires the server to execute (a portion of) $P_c$ in order to compute the expected challenge-response. Obviously, this is expensive and is hence used rarely.

The combination of the two schemes above, with the first scheme executed most often, provides a balance between efficiency and robustness of tamper-resistance (i.e., protection). One should remember that a single failed check is enough to classify client C as a compromised client.

Computing $r_2(x_2)$—Consider the program $P_c$ as a collection of pieces. On any input x (out of a finite large set), one piece in the collection is "special"—some signature configuration is encountered when it is reached. Which piece is special (the "coordinates" $C_x$) depends on h and $K_h$—this is the individualization. The server doesn't have to execute the program to verify the challenge-response. The relationship (x, $C_x$) can be verified by using the secret key. The "special configuration" might be a known pattern that is hard to detect without executing the relevant piece of code—something like an Easter egg. There is a response module: It calls different functions, and checks if the Easter egg has been found, and if so, in which function. The function ƒ is one of the functions that might be special—this forces its execution for computing the response $r_2$. A problem with the above scheme is that only a finite set of challenges "x" is possible. The solution is in posing many more (say 1000 times more) dummy challenges. The correct response to these would be a "no-show" response. Thus, most of the time $x_2$ is a dummy challenge soliciting a dummy no-show response. However, in order to know which challenges are dummy and which are not, the client has to execute (a portion of) $P_c$ on $x_2$. The server S, however, doesn't need to execute $P_c$.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for facilitating the tamper-resistance of computer-executable instructions, the method comprising:
   first obtaining a first execution-identifying signature of a first program module, where the first program module includes hidden modification detection code for use in detecting code alterations, and where the first execution-identifying signature represents a first hash value generated by hashing an execution trace, the execution trace being a historical computation record which identifies how various morsels of data changed during multiple execution instances of the first program module with a specified first set of input parameters, the first execution-identifying signature therefore being based in part on execution of the hidden modification detection code included in the first program module, the first program module comprising one or more computer-executable instructions;
   second obtaining a second execution-identifying signature of a second program module, where the second program module includes the hidden modification detection code, and where the second execution-identifying signature represents an expected hash value generated by hashing an execution trace which represents multiple execution instances of the second program module with the specified first set of input parameters when no alteration has been made to the second program module, the second program module comprising one or more computer-executable instructions; and
   comparing the first and the second execution-identifying signatures to determine whether the first program module has been altered.

2. A method as recited in claim 1, wherein program modules having distinct execution-identifying signatures indicate that such program modules have distinct computer-executable instructions.

3. A method as recited in claim 1, wherein program modules having distinct execution-identifying signatures indicate one or more execution instances of computer-executable instructions that are distinct between such modules.

4. A method as recited in claim 1, wherein program modules having distinct execution-identifying signatures indicate one or more execution instances of computer-executable instructions that are distinct between such modules, wherein the execution instances of such modules utilize the same input parameters.

5. A method as recited in claim 1, wherein the first and second program modules are input-parameter deterministic.

6. A method as recited in claim 1, wherein the first obtaining comprises generating the execution trace based on multiple execution instances of the first program module with the specified first set of input parameters.

7. A method as recited in claim 1, wherein
   the first execution-identifying signature represents output of one or more execution instances of the first program module with the specified first set of input parameters;
   the second execution-identifying signature represents output of one or more execution instances of the second program module with the specified first set of input parameters.

8. A method as recited in claim 1, wherein the second obtaining comprises producing the second execution identifying signature.

9. A method as recited in claim 1 further comprising:
   comparing the first and the second execution-identifying signatures to determine whether the second program module match;
   indicating whether the first and the second execution-identifying signatures match.

10. A computer-readable storage medium having computer-executable instructions that, when executed by a computer, performs a method as recited in claim 1.

11. A computer comprising one or more computer-readable storage media having computer-executable instructions that, when executed by the computer, perform a method as recited in claim 1.

12. A method for facilitating the tamper-resistance of computer-executable instructions, the method comprising:
   first obtaining a first output-identifying signature of a first program module, the first output-identifying signature represents a first hash value generated by hashing a first historical record of outputs generated from multiple execution instances of the first program module with a specified first set of input parameters, the first program module comprising one or more computer-executable instructions;
   second obtaining a second output-identifying signature of a second program module, the second output-identifying signature represents a second hash value generated by hashing a second historical record of outputs generated from multiple execution instances of the second program module with the specified first set of input parameters when no alteration has been made to the second program module, the second program module comprising one or more computer-executable instructions; and comparing the first and the second output-identifying signatures to determine whether the first program module has been altered.

13. A method as recited in claim 12, wherein program modules having distinct output-identifying signatures indicate that such program modules have distinct computer-executable instructions.

14. A method as recited in claim 12, wherein program modules having distinct output-identifying signatures indicate one or more execution instances of computer-executable instructions that are distinct between such modules.

15. A method as recited in claim 12, wherein program modules having distinct output-identifying signatures indicate one or more execution instances of computer-executable instructions that are distinct between such modules, wherein the execution instances of such modules utilize the same input parameters.

16. A method as recited in claim 12, wherein the specified first set of input parameters and the specified second set of input parameters are equivalent.

17. A method as recited in claim 12, wherein the first and second program modules are input-parameter deterministic.

18. A method as recited in claim 12, wherein the first obtaining comprises generating an output trace of multiple execution instances of the first program module with a specified first set of input parameters.

19. A method as recited in claim 12, wherein the second obtaining comprises producing the second signature.

20. A method as recited in claim 12 further comprising:
comparing the first and the second output-identifying signatures to determine whether the first and the second program modules match;
indicating whether the first and the second output-identifying signatures match.

21. A computer-readable storage medium having computer-executable instructions that, when executed by a computer, performs a method as recited in claim 12.

22. A computer comprising one or more computer-readable storage media having computer-executable instructions that, when executed by the computer, perform a method as recited in claim 12.

23. A method for facilitating the tamper-resistance of computer-executable instructions, the method comprising:
first obtaining a first integrity signature of a first program module, where the first program module includes hidden modification detection code for use in detecting code alterations regardless of barriers implemented for preventing such alterations, and where the first integrity signature represents a first hash value generated by hashing an execution trace, the first integrity signature being based in part on execution of the hidden modification detection code included in the first program module, the first program module comprising one or more computer-executable instructions;
second obtaining a second integrity signature of a second program module, where the second program module includes the hidden modification detection code, and where the second integrity signature represents an expected hash value generated by hashing an execution tracing which represents one or more execution instances of the second program module with the specified first set of input parameters when no alteration has been made to the second program module, the second program module comprising one or more computer-executable instructions; and
comparing the first and the second integrity signatures to determine whether the first program module has been altered.

24. A method as recited in claim 23, wherein the first integrity signature comprises an execution-identifying signature that represents at least one execution instances of the first program module with one or more parameters of the specified first set of input parameters.

25. A method as recited in claim 23, wherein the first integrity signature comprises an output-identifying signature that represents output from multiple execution instances of the first program module with the specified first set of input parameters.

26. A method as recited in claim 23, wherein the first integrity signature comprises an execution-identifying signature that represents at least one execution instances of the first program module with one or more parameters of the specified first set of input parameters and an output-identifying signature that represents output from multiple execution instances of the first program module with the specified first set of input parameters.

27. A method as recited in claim 23, wherein the second integrity signature comprises an execution-identifying signature that represents at least one execution instances of the second program module with one or more parameters of the specified second set of input parameters.

28. A method as recited in claim 23, wherein the second integrity signature comprises an output-identifying signature that represents output from multiple execution instances of the second program module with a specified second set of input parameters.

29. A method as recited in claim 23, wherein the second integrity signature comprises an execution-identifying signature that represents at least one execution instances of the second program module with one or more parameters of the specified second set of input parameters and an output-identifying signature that represents output from multiple execution instances of the second program module with a specified second set of input parameters.

30. A method as recited in claim 23, wherein the first and second program modules are input-parameter deterministic.

31. A computer-readable storage medium having computer-executable instructions that, when executed by a computer, performs a method as recited in claim 23.

32. A method for facilitating the tamper-resistance of a program module having computer-executable instructions, the method comprising:
generating an execution trace of one or more execution instances of the instructions of the module with a specified set of input parameters, the execution trace being a historical computation record which identifies how various morsels of data changed during one or more execution instances of the program module with a specified first set of input parameters;
hashing the execution trace to generate a hash value;
wherein distinct traces are based in part on execution of hidden modification detection code included in the program module for use in detecting code alterations independently of barriers implemented for preventing such alterations, and wherein the distinct traces represent one or more execution instances of distinct instructions of the module with the same specified set of input parameters; and comparing the hash value with an expected hash value generated by hashing an execution tracing which represents one or more execution instances of an unaltered program module with the specified first set of input parameters.

33. A method as recited in claim 32, wherein the execution trace is a history of data values that may be altered during the execution of the instructions of the program module.

34. A method as recited in claim 32, wherein the generating comprises taking a plurality of snapshots of data values that are likely to change during the execution of the instructions of the program module.

35. A method as recited in claim 32 further comprising deriving an execution-identifying signature from the execution trace, the signature being representative of the execution trace.

36. A method as recited in claim 35 further comprising:
associating the signature and the parameters with the program module;
storing the signature and the parameters.

37. A method as recited in claim 35, wherein the deriving comprises hashing the execution trace.

38. A computer-readable storage medium having computer-executable instructions that, when executed by a computer, performs a method as recited in claim 32.

39. A computer-readable storage medium having the program module of claim 32, the computer-executable instructions of the module, when executed by a computer, performs a method as recited in claim 32.

40. A computer-readable storage medium having the program module of claim 32, wherein, after the generating, the computer-executable instructions of the module are modified.

41. A computer-readable storage medium having the program module of claim 32, wherein, after the generating, the computer-executable instructions of the module are modified so that execution of the modified instructions generates a trace that is distinct from the trace of the instructions before modification.

42. A computer comprising one or more computer-readable storage media having computer-executable instructions that, when executed by the computer, perform a method as recited in claim 32.

43. A method for facilitating the tamper-resistance of a program module having computer-executable instructions, the method comprising:
augmenting an unprotected program module with additional computer-executable instructions for use in detecting code alterations independently of barriers implemented for preventing such alterations to produce a protected program module,
wherein the additional computer-executable instructions generate a first execution-identifying signature when the instructions of the protected module are executed with a specified set of input parameters, the first execution-identifying signature represents a first hash value generated by hashing an execution tracing, the execution tracing being a historical computation record which identifies how various morsels of data changed during one or more execution instances of the first program module with a specified first set of input parameters, the first execution-identifying signature therefore being based in part on execution of the hidden modification detection code included in the first program module; and
comparing the first execution-identifying signature to a second execution-identifying signature to determine whether the first program module has been altered, wherein the second execution-identifying signature has been generated by a second program module which has not been altered.

44. A computer-readable storage medium having computer-executable instructions that, when executed by a computer, performs the method as recited in claim 43.

45. A computer-readable storage medium having the protected program module of claim 43, wherein the computer-executable instructions of the protected program module are modified.

46. A computer comprising one or more computer-readable storage media having computer-executable instructions that, when executed by the computer, perform a method as recited in claim 43.

47. A method for facilitating the authentication of program modules having computer-executable instructions, the method comprising:
first obtaining a first execution-identifying signature of a first program module, where the first program module includes hidden modification detection code for use in detecting code alterations independently of barriers implemented for preventing such alterations, and where the first execution-identifying signature represents a first hash value generated by hashing an execution tracing, the execution tracing being a historical computation record which identifies how various morsels of data changed during one or more execution instances of the first program module with a specified first set of input parameters, the first execution-identifying signature therefore being based in part on execution of the hidden modification detection code included in the first program module;
second obtaining a second execution-identifying signature of a second program module, where the second program module includes the hidden modification detection code, and where the second execution-identifying signature represents an expected hash value generated by hashing an execution tracing which represents one or more execution instances of the second program module with the specified first set of input parameters when no alteration has been made to the second program module;
comparing the first and the second execution identifying signatures; and
authenticating the first program module if the execution identifying signatures match.

48. A method as recited in claim 47, wherein the second obtaining comprises:
requesting the second signature from a remotely coupled computer;
receiving the second signature from the remotely coupled computer.

49. A computer-readable storage medium having computer-executable instructions that, when executed by a computer, performs a method as recited in claim 47.

50. A computer comprising one or more computer-readable storage media having computer-executable instructions that, when executed by the computer, perform a method as recited in claim 47.

51. A system facilitating the authentication of program modules having computer-executable instructions, the system comprising:
a challenger configured to send a challenge to a computer via a communications network, the computer having a program module comprising computer-executable instructions and hidden modification detection code for detecting code alterations independently of barriers implemented for preventing such alterations;

a response-receiver configured to receive a response from the computer, the response including an execution-identifying signature of the program module, the execution identifying signature being based on execution of the hidden modification detection code the signature represents a hash value generated by hashing an execution tracing, the execution tracing being a historical computation record which identifies how various morsels of data changed during one or more execution instances of the first program module with a specified set of input parameters, the signature therefore being based in part on execution of the hidden modification detection code included in the program module; and an authenticator configured to authenticate the program module, wherein the authenticator compares the signature of the program module with previously generated signature associated with the program module to determine whether the program module has been modified.

52. A system for facilitating the tamper-resistance of a digital good, the system comprising:

a memory comprising a set of computer program instructions that include hidden modification detection code for use in detecting code alterations independently of barriers implemented for preventing such alterations; and a processor coupled to the memory, the processor being configured to execute the computer program instructions, which comprise:

producing an execution-identifying signature based on execution of the hidden modification detection code, the execution identifying signature represents a hash value generated by hashing an execution trace, the execution trace being a historical computation record which identifies how various morsels of data changed during multiple execution instances of the program module with a specified set of input parameters, the execution identifying signature therefore being based in part on execution of the hidden modification detection code included in the program module;

comparing the execution-identifying signature with a previously generated execution-identifying signature to determine whether the set of computer program instructions has been altered.

53. A system as recited in claim 52, wherein the producing comprises hashing an execution trace of the multiple execution instances of the program module.

54. A system as recited in claim 52, wherein the producing comprises hashing the execution trace of the multiple execution instances of the the program module.

55. A computer-readable medium including a tangible component having computer-executable instructions that, when executed by a computer, performs a method comprising:

generating an execution trace of one or more execution instances of the computer-executable instructions with a specified set of input parameters, wherein distinct traces are generated by hidden modification detection code added to the computer-executable instructions for use in detecting code alterations independently of barriers implemented for preventing such alterations, and wherein the distinct traces represent one or more execution instances of distinct instructions with the same specified set of input parameters; and comparing the execution trace with a previously generated execution trace to determine whether the computer-executable instructions have been altered, wherein the execution trace and the previously generated execution trace each represent historical computation records which identify how various morsels of data changed during one or more execution instances when provided with the same specified set of input parameters.

56. A computer-readable medium including a tangible component and having computer-executable instructions that, when executed by a computer, performs a method comprising:

producing an execution-identifying signature for use in detecting code alterations independently of barriers implemented for preventing such alterations, where the execution-identifying signature represents a hash value generated by hashing an execution tracing, the execution tracing being a historical computation record which identifies how various morsels of data changed during one or more execution instances of the first program module with a specified set of input parameters; and comparing the execution-identifying signature with a previously generated execution-identifying signature to determine whether the computer-executable instructions have been altered.

* * * * *